US007815161B2

(12) United States Patent
Saitoh et al.

(10) Patent No.: US 7,815,161 B2
(45) Date of Patent: Oct. 19, 2010

(54) COMPACT VALVE

(75) Inventors: Akihiko Saitoh, Kadoma (JP); Shigeru Dohno, Osaka (JP); Takao Goto, Shijonawate (JP); Ken Yamamoto, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 462 days.

(21) Appl. No.: 11/996,826

(22) PCT Filed: Jul. 26, 2006

(86) PCT No.: PCT/JP2006/314749
§ 371 (c)(1),
(2), (4) Date: Jan. 25, 2008

(87) PCT Pub. No.: WO2007/013498
PCT Pub. Date: Feb. 1, 2007

(65) Prior Publication Data
US 2010/0139785 A1  Jun. 10, 2010

(30) Foreign Application Priority Data
Jul. 26, 2005 (JP) ............................. 2005-215555
Jul. 26, 2005 (JP) ............................. 2005-215601
Apr. 25, 2006 (JP) ............................. 2006-120351

(51) Int. Cl.
*F16K 31/02* (2006.01)
(52) U.S. Cl. .................... 251/11; 251/129.01; 251/294; 251/337
(58) Field of Classification Search .................. 251/11, 251/129.01, 129.06, 294, 337
See application file for complete search history.

(56) References Cited
U.S. PATENT DOCUMENTS
3,613,732 A * 10/1971 Willson et al. ......... 137/625.44
(Continued)

FOREIGN PATENT DOCUMENTS
JP          61-52478          3/1986
(Continued)

OTHER PUBLICATIONS
English language Abstract of JP 2-8573.
(Continued)

*Primary Examiner*—John Bastianelli
(74) *Attorney, Agent, or Firm*—Greenblum & Bersntein, P.L.C.

(57) ABSTRACT

A compact valve using a shape memory alloy comprises: a moving valve body that contacts an inner periphery of a guide pipe having an built-in orifice, is freely movable and has a sealing portion to seal the orifice; a biasing coil provided between the orifice and the moving valve body; and a wire formed of a shape memory alloy and held between a stationary electrode of the guide pipe and a moving electrode of the moving valve body. The orifice is sealed by moving the moving valve body due to transformation of the shape memory alloy by heating the wire. The moving valve body is enabled to be elastically deformable by providing a coil spring to reduce a stress, so that an overload to the moving valve body due to contraction of the wire is absorbed by elastic deformation of the moving valve body. Thereby, the overload to the shape memory alloy is reduced to prevent deterioration of repeatability of memorized shape, to increase durability and reliability of the valve.

11 Claims, 14 Drawing Sheets

U.S. PATENT DOCUMENTS

| | | | |
|---|---|---|---|
| 4,750,520 A * | 6/1988 | Heim et al. | 251/11 |
| 4,973,024 A * | 11/1990 | Homma | 251/11 |
| 5,211,371 A * | 5/1993 | Coffee | 251/11 |
| 5,345,963 A | 9/1994 | Dietiker | |
| 5,622,482 A * | 4/1997 | Lee | 417/321 |
| 6,179,921 B1 * | 1/2001 | Ruffell et al. | 251/129.22 |
| 6,247,678 B1 * | 6/2001 | Hines et al. | 251/11 |
| 6,679,263 B2 | 1/2004 | Luchetti et al. | |
| 6,742,761 B2 * | 6/2004 | Johnson et al. | 251/11 |
| 6,840,257 B2 * | 1/2005 | Dario et al. | 137/9 |
| 6,843,465 B1 * | 1/2005 | Scott | 251/129.06 |

FOREIGN PATENT DOCUMENTS

| | | |
|---|---|---|
| JP | 2-8573 | 1/1990 |
| JP | 1990-008573 | 1/1990 |
| JP | 5-99369 | 4/1993 |
| JP | 7-13010 | 3/1995 |
| JP | 8-285127 | 11/1996 |
| JP | 9-313363 | 12/1997 |
| JP | 10-325480 | 12/1998 |
| JP | 11-153234 | 6/1999 |
| JP | 2004-204918 | 7/2004 |

OTHER PUBLICATIONS

English language Abstract of JP 5-99369.
English language Abstract of JP 2004-204918.
English language Abstract of JP 61-52478.
English language Abstract of JP 8-285127.
English language Abstract of JP 10-325480.
English language Abstract of JP 9-313363.
English language Abstract of JP 11-153234.

* cited by examiner (a)

(b)

(c)

(a)

(b)

(c)

(a)

(b)

(a)

(b)

(a)

(b)

(a)

(b)

(a)

(b)

COMPACT VALVE

TECHNICAL FIELD

The present invention relates to a compact valve which utilizes a shape memory alloy to control open and close of paths for various fluids such as air, liquid, or the like.

BACKGROUND ART

As for such a compact valve, it is conventionally known that an actuator for a valve body that opens and closes an orifice is formed of a shape memory alloy, and the valve body is displaced by applying electric current to the actuator, as shown in Japanese Laid-Open Patent Publication No. 05-99369, for example. In such a control valve, in order to increase sealing property of the orifice, it is necessary to increase a pressure applied to the orifice, so that the shape memory alloy serving as the actuator contracts after contacting the orifice and further pressurizes the orifice in closing operation of the valve. In addition, the orifice is additionally pressurized due to variation of the shape memory alloy in manufacturing process thereof. The shape memory alloy receives a stress (a load) from the orifice that is fixed on the valve body. The stronger the pressure to the orifice from the shape memory alloy becomes, the larger the stress becomes.

Generally, a shape memory alloy which fevers by energization has repeatability that it takes an extended shape at normal temperature, fevers by energization, takes a previously memorized contracted shape when a temperature thereof becomes higher than a certain temperature value, and returns to the original shape when the temperature thereof returns to the normal temperature. However, when an overload is applied to the shape memory alloy in a state of memorized shape, the repeatability of recovery may be damaged, and thus, it cannot return to the shape originally memorized due to deterioration with age by repetition of the overloads.

On this account, in a valve using a shape memory alloy as an actuator, when repeatability of recovery of the shape memory alloy is deteriorated, control performance of the valve falls off. In addition, the valve shown in above mentioned Patent Publication needs two shape memory alloys as the actuator, so that configuration thereof becomes complex and it causes high cost of production.

In addition, as shown in Japanese Laid-Open Patent Publication No. 09-313363, for example, there is a valve in which a coil spring formed of a shape memory alloy extends when a temperature thereof becomes above a predetermined value, and overcomes a biasing force of a biasing spring, so that a valve body in open state is pressurized to be closed. Since the shape memory alloy is formed in the coil spring shape, so that a profile of the valve becomes larger, and thus, downsizing of the valve is difficult. In addition, when thickening a diameter of a wire of the coil spring to obtain a predetermined force, responsiveness in heat radiation becomes worse due to increase of heat capacity of the coil spring. In addition, as shown in Japanese Laid-Open Patent Publication No. 11-153234, there is a valve that uses a wire formed of a shape memory alloy to perform closing operation. Since temperature distribution occurs in a folded portion of the wire, durability of the valve is easily deteriorated by thermal stress. When the wire works to operating limit, the shape memory alloy suffers from overloads, and thus, deterioration with age occurs.

DISCLOSURE OF INVENTION

An object of the present invention is to solve the problems mentioned above, and to provide a compact valve in which an orifice is sealed by transforming a wire formed of a shape memory alloy by heating, and which maintains resistance to deterioration and increases reliability, by preventing occurrence of deterioration with age of a shape memory alloy because of enabling elastically to transform an overall length of a movable structure including a sealing body, and to reduce a stress in heating of the wire by the elastic deformation of the movable structure.

In order to achieve the above mentioned object, an aspect of the present invention is a compact valve that opens and closes a fluid path with utilizing transformation of a shape memory ally due to energization heating, characterized by that the compact valve comprises: a stationary structure of a cylindrical shape having an orifice that constitutes the fluid path; a moving structure that contacts an inner periphery of the stationary structure, and has a sealing member freely movable to seal the orifice; a wire formed of a shape memory alloy to move the moving structure; and a first electrode and a second electrode to hold the wire and to energize the wire, and wherein the moving structure is configured so that a length thereof is elastically variable, and is movable to seal the orifice by varying a length of the wire due to energization heating to the wire; and the moving structure elastically transforms when sealing the orifice, and thereby, a stress that the wire receives can be reduced.

According to the present invention, a cushion effect by elastic deformation of the moving structure, a stress applied to the wire, that is, the shape memory alloy can be reduced in the energization heating to the wire. Thereby, it is possible to prevent the overload due to an excess pressure to the shape memory alloy, so that repeatability of memorized shape of the shape memory alloy is not deteriorated, and thus, durability and high reliability of the valve can be obtained.

It is preferable that a part of or whole of the moving structure is formed of an elastic material. Thereby, a coil spring for reducing the stress that the wire receives in the energization heating to the wire becomes unnecessary, and thus, a number of elements can be reduced and the structure of the moving valve body can be simplified.

It is preferable that the moving structure has a spring member. Thereby, elastic function of the moving structure can be realized by a spring that has a defined elastic specification, so that the elastic function can be designed precisely.

It is preferable that the spring member is provided to contact an outer periphery of the stationary structure. Thereby, the spring member appears outward of the stationary structure, so that the wire between the first electrode and the second electrode can be disposed without penetrating the spring member, and thus, manufacture of the valve becomes easier.

It is preferable that an end of the second electrode is fixed on the stationary structure, the other end thereof is connected to the wire, and a center portion between both of the ends contacts the moving structure, and thus, the moving structure is moved by bending of the electrode. Thereby, although an end of the second electrode is fixed, the other end to which the wire is connected becomes movable, so that connection of a lead wire for energization to the second electrode that serves as a moving side entirely can be performed in a stationary side, and thus, reliability of connection of the lead wires can be increased.

It is preferable that the first electrode is fixed on the stationary structure and the second electrode is connected to the moving structure. Thereby, an end of the wire can surely fixed at a fixing position and can pull the stationary structure at the other end, so that contraction of the shape memory alloy in energization can surely transmit to the moving structure, and thus, normally open mechanism that the valve is opened in energization state and closed in non-energization state can easily be realized.

It is preferable that the first electrode is fixed on a predetermined position on the stationary structure and the second electrode is fixed on another position other than that mentioned before on the stationary structure, a center portion between both ends of the wire pressurizes an end of the moving structure, and a direction of contraction and expansion of the wire is perpendicular to a moving direction of the moving structure. Thereby, it is possible to obtain a large stroke of displacement of the moving structure can be obtained by a small contraction of the wire. Consequently, the length of the wire can be shortened in comparison with the necessary stroke of the moving structure. In addition, since the electrodes to which both ends of the wire are connected are fixed, reliability of connection of lead wires for energization which are connected to the electrodes can be increased.

It is preferable that an end of the moving structure has a contacting portion that contacts the wire and the contacting portion is formed of a metal with a resin coating. Thereby, heat conduction of heat generated in the wire by energization to the contacting portion can be reduced, and heat radiation from the wire to the stationary structure can be restrained, so that contraction efficiency of the shape memory alloy due to energization can be increased and moving response of the moving structure can be fastened. In addition, mechanical strength of the contacting portion can be ensured.

It is preferable that surfaces of the first electrode and the second electrode are coated by resin. Thereby, heat radiation from the wire to the stationary structure can be restrained, so that moving response of the moving structure can be fastened.

Another aspect of the present invention is a compact valve that opens and closes a fluid path with utilizing transformation of a shape memory ally due to energization heating, characterized by that the compact valve comprises: a stationary structure of a cylindrical shape having a built-in orifice member that constitutes the fluid path; a moving structure that contacts an inner periphery of the stationary structure and is freely movable to seal the orifice; a wire formed of a shape memory alloy to move the moving structure; a first electrode and a second electrode that is held by one or both of the stationary structure and the moving structure, hold the wire and energize the wire; a first elastic member to apply a tensile stress to the wire as a bias; a second elastic member to reduce a stress that the wire receives in energizing heating to the wire, and wherein the moving structure is configured movable to seal the orifice by varying a length of the wire due to energization heating to the wire; the orifice member is movably provided in the stationary structure independently from the stationary structure; the first elastic member is provided between the orifice member and the moving structure in the stationary structure; and the second elastic member is provided between the orifice member and an end portion of the stationary structure opposite to a side for sealing the orifice. Thereby, an overload to the shape memory alloy in closing operation of the valve by heating can be reduced by cushion effect of the elastic deformation of the second elastic member. Consequently, reliability of memorized shape of the shape memory alloy may not be deteriorated, and durability thereof is maintained and reliability of the valve can be increased. In addition, since the orifice member is independently configured from the stationary structure, manufacture of the orifice becomes easier and machining accuracy thereof can be increased.

Still another aspect of the present invention is a compact valve that opens and closes a fluid path with utilizing transformation of a shape memory ally due to energization heating, characterized by that the compact valve comprises: a stationary structure of a cylindrical shape having a built-in orifice member that constitutes the fluid path; a moving structure that contacts an inner periphery of the stationary structure and is freely movable to seal the orifice; a wire formed of a shape memory alloy to move the moving structure; a first electrode and a second electrode that is held by one or both of the stationary structure and the moving structure, hold the wire and energize the wire; a first elastic member to apply a tensile stress to the wire as a bias; a second elastic member to reduce a stress that the wire receives in energizing heating to the wire, and wherein the moving structure is configured movable to seal the orifice by varying a length of the wire due to energization heating to the wire; the first electrode has a plate spring structure serving as a function of the second elastic member; and the second electrode has a plate spring structure serving as a function of the first elastic member. Thereby, a number of elements that constitute the valve can be reduces, and thus, productivity of the valve can be increased.

BRIEF DESCRIPTION OF DRAWINGS

FIG. 12(b) is a magnified view of a portion designated by a character "A" in FIG. 12(a).

BEST MODE FOR CARRYING OUT THE INVENTION

Figure 1:
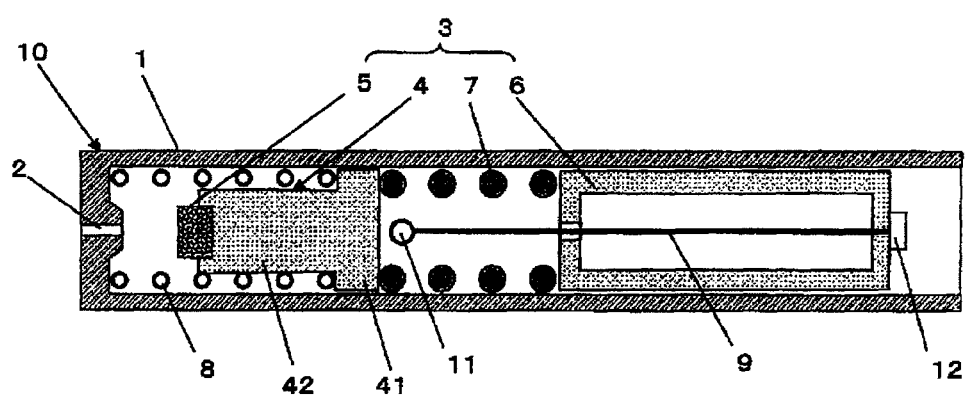
FIG. 1 is a sectional view of a compact valve in accordance with a first embodiment of the present invention.

A compact valve in accordance with a first embodiment of the present invention is described below with reference to FIG. 1, FIGS. 2(a), 2(b) and 2(c). The compact valve 10 of this embodiment utilizes a phenomenon that a shape memory alloy is transformed by heating due to current supply for opening and closing a fluid path. It comprises a cylindrical shaped guide pipe (stationary structure) 1 which is formed of a metal or resin; an orifice 2 formed of a metal or a resin that constitutes the fluid path built-in the guide pipe 1; a moving valve body (moving structure) 3 that seals the orifice 2 in freely movable state; a wire 9 made of a shape memory alloy (or a shape memory resin, a shape memory rubber, or the like) that drives the moving valve member 3; and a biasing coil 8. The moving valve body 3 has a first moving portion 4, a second moving portion 6, a sealing portion (sealing member) 5 which is formed of a resin or a rubber for sealing the orifice 2 and provided at a front end of the first moving portion 4 facing the orifice 2, and a coil spring (an elastic member for reducing overload) 7 provided between these moving portions. The coil spring 7 is disposed between the first moving portion 4 and the second moving portion 6, and reduces stress to the shape memory alloy in heating. The biasing coil 8 is provided between the moving valve body 3 and the orifice 2 and contacts a part of an outer periphery of the first moving portion 4, so that it supplies tensile stress to the wire 9 as a bias.

The wire 9 is held by a stationary electrode (first electrode) 11 and a moving electrode (second electrode) 12 at both ends thereof. The stationary electrode 11 is provided on the stationary guide pipe 1 at a position between the first moving portion 4 and the second moving portion 6, and the moving electrode 12 is provided on a rear end of the second moving portion 6. As for the shape memory alloy that constitutes the wire 9, an energization heating type one (for example, Ti—Ni system shape memory alloy), which contracts when a temperature thereof becomes higher than a predetermined value, is used. Thus, when a DC voltage is supplied to energize the shape memory alloy, the temperature thereof increases by self fever, and it recovers to a previously memorized contracted shape. Such shape recovery force is larger than elastic forces of the biasing coil 8 and the coil spring 7. In addition, an elastic coefficient k2 of the coil spring 7 is set to be smaller than an elastic coefficient k1 of the biasing coil 8.

The first moving portion 4 is configured by a first cylinder portion 41 that contacts an inner periphery of the guide pipe 1, and a second cylinder portion 42 that extends from the first cylinder portion 41 toward the orifice 2 and has a diameter smaller than that of the first cylinder portion 41. When the first cylinder portion 41 receives a pressure by the biasing coil 8 in a direction opposite to the orifice 2, the first moving portion 4 is departed from the orifice 2. Thus, a space is formed between the orifice 2 and the sealing portion 5 in a normal state with no energization, so that the sealing portion 5 does not close the orifice 2 (normally open).

In the above mentioned configuration, when the wire 9 formed of the shape memory alloy is energized through the stationary electrode 11 and the moving electrode 12, it fevers and transforms to contract when the temperature thereof becomes higher than a certain temperature. At this time, since an end of the wire 9 on the stationary electrode 11 is fixed so as not to be moved, the end of the wire 9 on the moving electrode 12 moves with the second moving portion 6. Movement of the second moving portion 6 pressurizes the coil spring 7, and the coil spring 7 further pressurizes the first moving portion 4 to the orifice 2, and consequently, pressurizes the biasing coil 8 to the orifice 2. The sealing portion 5 at the front end of the first moving portion 4 stops in a state to seal the orifice 2 with pressurizing. In this way, the valve 10 transforms from a state shown in FIG. 2(a) to a state shown in FIG. 2(b).

When stopping the energization to the wire 9, the temperature value of the wire 9 falls down, and the wire 9 extends when the temperature comes back to the original value, so that the first moving portion 4 returns to the original position, the sealing portion 5 departs from the orifice 2 by the actions reverse to the above, and thus, the orifice 2 is opened.

In the above mentioned motions, after the sealing portion 5 contacts the orifice 2, the wire 9 further contracts so that the sealing portion 5 contacts the orifice 2 with pressure for tightly sealing it. Such contact with pressure varies due to variation of the wires 9 as elements, so that the contraction of the wire 9 is set to be larger to admit the variation of the elements, beforehand. In tightly sealing, the biasing coil 8 is in a compressed state, so that the coil spring 7 is started to be compressed, additionally.

Such processes are explained below. When assuming a contraction force of the wire 9 is designated by "F", a contraction length of the spring is designated by "x", an elastic coefficient is designated by "k", and an overall length with no external pressure is designated by "L", a length of the contracted spring "L" is shown by the following equation.

$$L = -x + L0 \text{ (L0: overall length before contraction)}$$

It is assumed that the lengths of the biasing coil 8 and the coil spring 7 after contraction are designated by "L1" and "L2", the lengths of them before contraction are designated by "La" and "Lb", and elastic coefficients of the springs are designated by "k1" and "k2".

Figure 2:
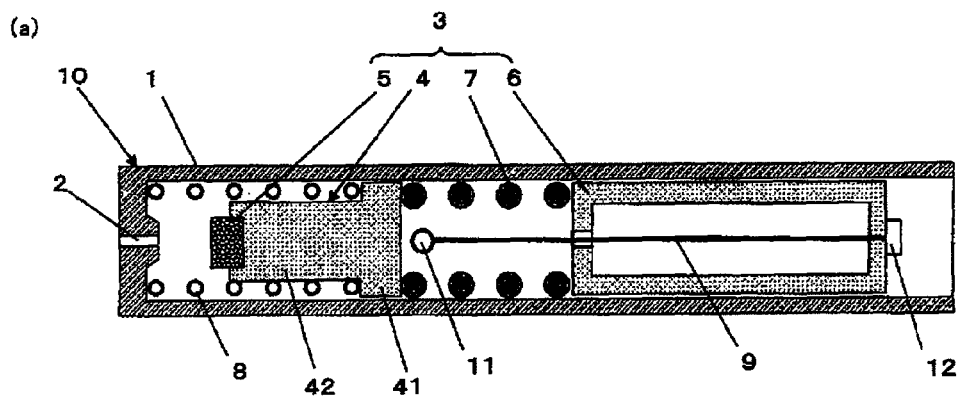
FIGS. 2($a$) and 2($b$) are respectively sectional views of the above mentioned valve in opening operation and closing operation of the valve, and FIG. 2($c$) is a graph showing contraction characteristics of a coil spring and a biasing coil.
Figure 2:
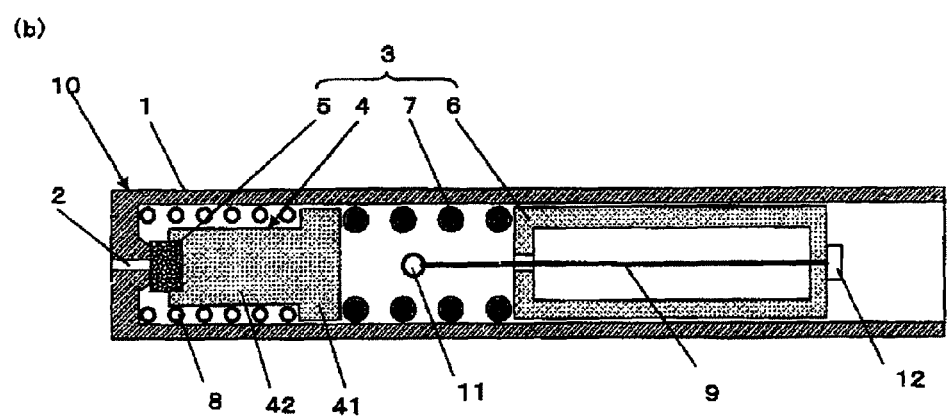
Figure 2:
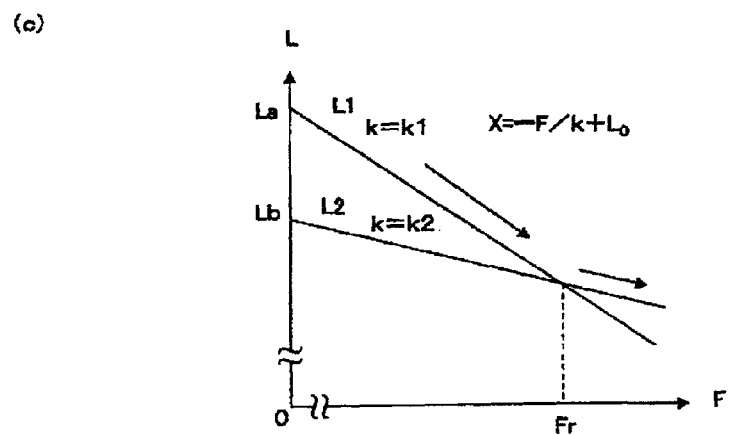

From the relationship of F=-kx, $$L1 = -x + La = -F/k1 + La$$

$$L2 = -x + Lb = -F/k2 + Lb$$

are established. Relationships among these L1, L2 and the contraction force F are shown in FIG. 2(c). Hereupon, the elastic coefficient k1 of the biasing coil 8 is selected to be larger than the elastic coefficient k2 of the coil spring 7. Therefore, the biasing coil 8 contracts earlier than the coil spring 7, and thus, the coil spring 7 rarely contracts until the sealing portion 5 contacts the orifice 2 and the contraction force becomes Fr. After contacting them, when contracting force F is applied to the orifice 2, it starts to contract.

Contraction of the coil spring 7 serves as a cushion to reduce a stress that directly acts on the wire 9, so that an overload to the wire can be reduced. Thereby, it is possible to prevent the transformation of the shape memorized in the shape memory alloy at a high temperature, so that repeatability and durability of the shape memory alloy and repeatability of open and close of the orifice can be improved due to disappearance of deterioration with age. Furthermore, the valve can be designed easily with high accuracy by constituting the biasing coil 8 with using a spring member that an elastic coefficient is specifically known.

In particular, the biasing coil 8 provided between the orifice 2 and the moving valve body 3 and the coil spring 7 for reducing stress provided on the moving valve body 3 are arranged serially, and the elastic coefficient k1 of the biasing coil 8 is selected to be larger than the elastic coefficient k2 of the coil spring 7, so that the moving valve body 3 can be deformed elastically in closing operation, and thus, the above mentioned advantageous effects can be obtained, consequently.

Subsequently, a compact valve in accordance with a second embodiment of the present invention is described with reference to FIGS. 3(a), 3(b) and 3(c). The compact valve 10 of this embodiment uses an elastic material such as a resin or a rubber for a part of or entire of a moving valve body 3a. Elements that are substantially the same as those in the first embodiment are designated by the same numerals (the same goes for other embodiments), so that differences from the first embodiment are described below. The moving valve body 3a is configured by a moving portion 4a that contacts an inner periphery of a guide pipe 1 and a sealing portion 5 to seal an orifice 2, and a biasing force is applied thereto by a coil spring 8 (SIC).

Figure 4:
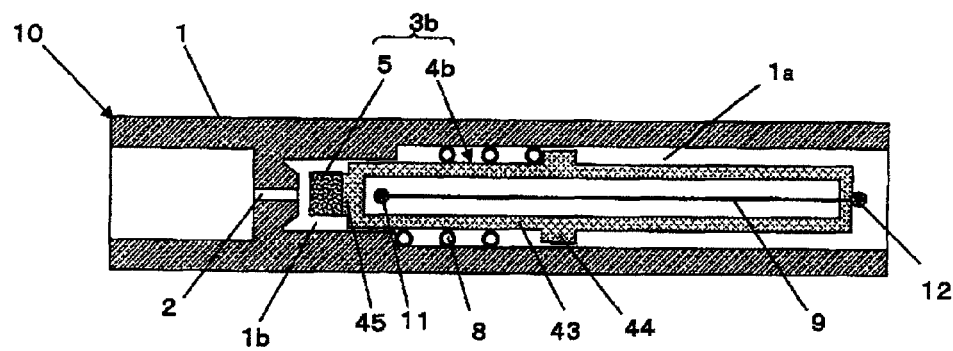
FIG. 4($a$) is a sectional view of a compact valve in accordance with a third embodiment of the present invention, and FIGS. 4($b$) and 4($c$) are sectional views of the same valve in opening operation and closing operation of the valve.
Figure 4:
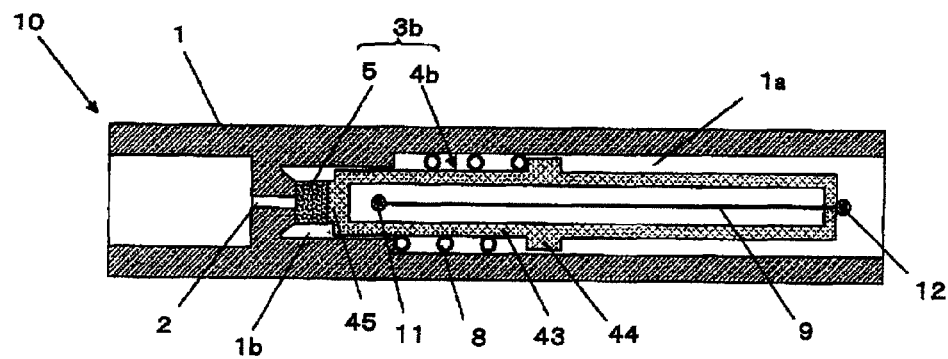
Figure 4:
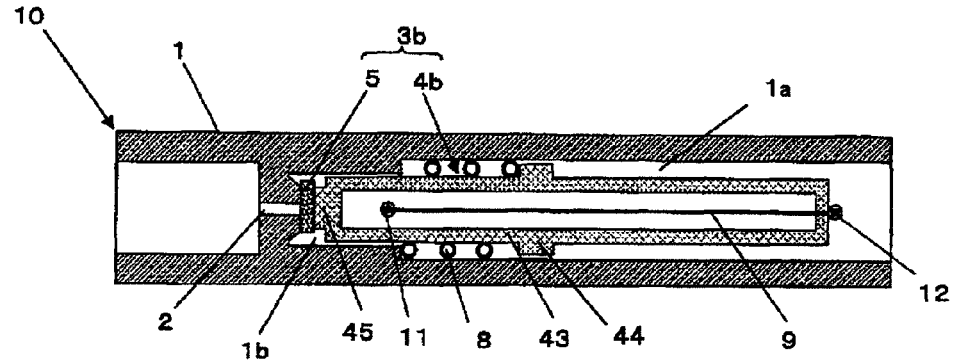
Figure 5:
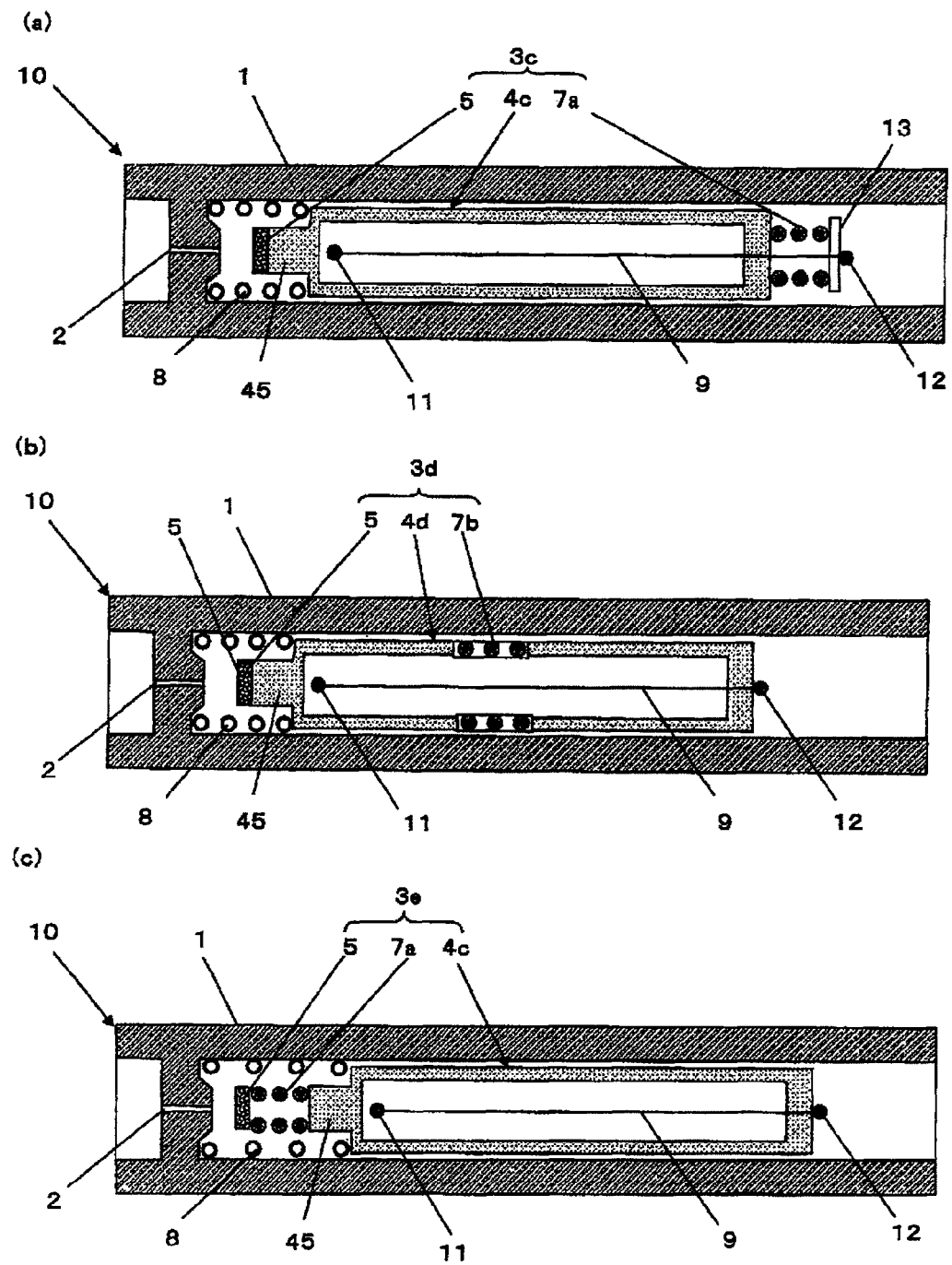
FIG. 5($a$) is a sectional view of a compact valve in accordance with a fourth embodiment of the present invention, and FIGS. 5($b$) and 5($c$) are sectional views of the same valve in opening operation and closing operation of the valve.

The moving portion 4a is configured by a main cylinder portion 43 having a smaller diameter, a cylinder portion 44 that contacts the inner periphery of the guide pipe 1, and a cylindrical column portion 45 that extends from an end of the main cylinder portion 43 and has the sealing portion 5. The guide pipe 1 has a cavity 1a to which the cylinder portion 44 contacts internally, and a little cavity 1b that has a smaller diameter and communicates the orifice 2. The coil spring 8 (SIC) is provided between an end of the main cavity 1a of the guide pipe 1 and the cylinder portion 44 of the moving portion 4a, and contacts the inner periphery of the guide pipe 1 and an outer periphery of the main cylinder portion 43, and pressurizes the moving valve body 3a entirely to a direction opposite to the orifice 2. Thus, it is configured that the sealing portion 5 may not close the orifice 2 in a normal state as shown in FIG. 3(a). In addition, the moving valve body 3a is formed of an elastic material, and shows elasticity as a whole. Besides, a stationary electrode 11 to which an end of a wire 9 formed of a shape memory alloy to drive the moving valve body 3a is fixed on the guide pipe 1 through a slit (not shown in the figure) provided on a wall surface of the moving valve body 3a (the same goes for FIG. 4 and FIG. 5 described below).

In the above mentioned configuration, when the wire 9 formed of the shape memory alloy is energized to fever, the wire 9 is contracted and the moving portion 4a compresses the biasing coil 8 due to such a contraction, so that the sealing portion 5 at a front end of the moving portion 4a contacts the orifice 2, and thus, the orifice 2 is sealed. In this way, the condition of the valve is varied from a state shown in FIG. 3(a) to a state show in FIG. 3(b). Hereupon, an elastic coefficient k1 of the biasing coil 8 is selected to be larger than an elastic coefficient k3 of the elastic material of the moving portion 4a, so that the moving portion 4a formed of the elastic material is rarely contracted by a contraction force until the sealing portion 5 contacts the orifice 2.

Figure 3:
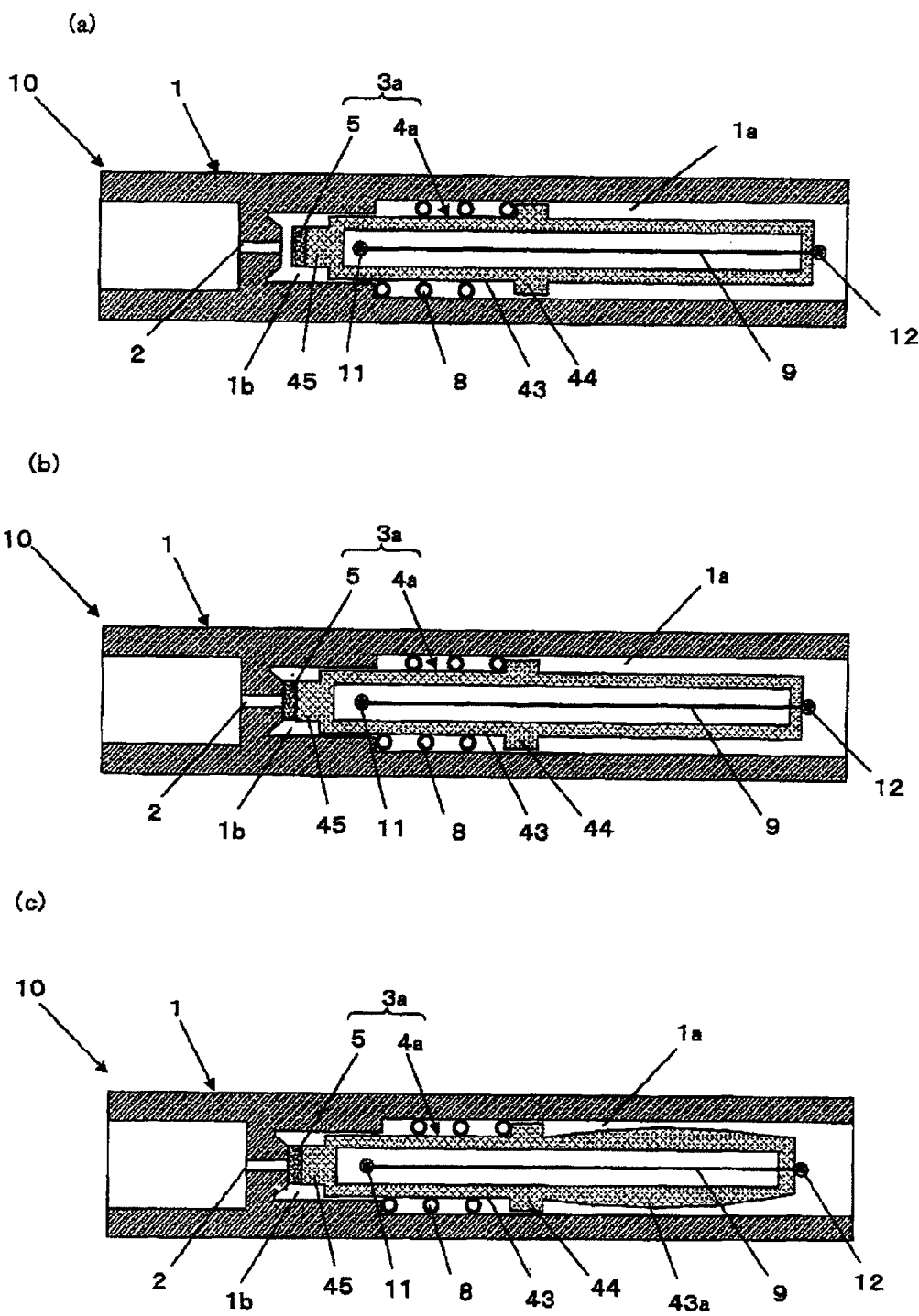
FIG. 3($a$) is a sectional view of a compact valve in accordance with a second embodiment of the present invention, and FIGS. 3($b$) and 3($c$) are sectional views of the same valve in opening operation and closing operation of the valve.

After contacting the sealing portion 5 with the orifice 2, when the wire 9 is further contracted and the sealing portion 5 pressurizes the orifice 2 for sealing more tightly, the moving portion 4a formed of the elastic material starts to be contracted, and the moving portion 4a deforms to expand in a radial direction (designated by a numeral 43a) as shown in FIG. 3(c), and thus, the orifice 2 is sealed. By such a deformation, a stress that the wire 9 receives as a reaction from the orifice 2 due to the contraction of the wire 9 can be reduced.

When stopping energization to the wire 9, temperature value of the wire 9 falls down. When the temperature value returns to an original temperature, the wire 9 extends and the moving portion 4a returns to the original position as shown in FIG. 3(a) due to inverse operations as mentioned above, and thus, the sealing portion 5 comes off from the orifice 2 and the orifice 2 is opened.

In this way, since the moving valve body 3a is formed of the elastic material and is contracted by the overload, it can serve as a cushion to reduce the stress applied to the wire 9. In other words, the moving valve body 3a itself has a function of the above mentioned elastic member to reduce the overload. Thereby, it is possible to reduce a number of elements of the compact valve further to the effects obtained by the above mentioned embodiment. In addition, it is possible to form a part of the moving valve body 3a as well as the thing which is formed entirely of the elastic material.

Subsequently, a compact valve in accordance with a third embodiment of the present invention is described with reference to FIGS. 4(a), 4(b) and 4(c). The compact valve 10 of this embodiment is essentially the same as those in the above mentioned embodiments, but it is different that a sealing portion 5 of a moving valve body 3b is formed of an elastic material.

The moving valve body 3b comprises a moving portion 4b formed of a metal or a resin and a sealing portion 5 to seal an orifice 2 at an end thereof, and the sealing portion 5 is formed of an elastic material such as a resin or a rubber. Since the moving valve body 3b has the sealing portion 5 formed of the elastic material, it becomes an elastic member as a whole. Hereupon, an elastic coefficient of the moving valve body 3b as a whole is designated by a symbol k3.

In the above mentioned configuration, when the wire 9 formed of the shape memory alloy is energized to fever, the wire 9 is contracted and the moving portion 3b moves due to such a contraction, so that the biasing coil 8 is contracted until the sealing portion 5 contacts the orifice 2. When the wire 9 is contracted furthermore, the elastic member of the sealing portion 5 is compressed and deformed. At this time, the valve is varied from a state shown in FIG. 4(a) to a state shown in FIG. 4(c) through a state shown in FIG. 4(b). Opening operations of the orifice 2 by stopping the energization to the wire 9 are the same as those described above.

Due to the above mentioned deformation of the sealing portion 5, an excess contraction force of the wire 9 is absorbed. In other words, contact of the sealing portion 5 to the orifice 2 with pressure following to the contraction of the wire 9 causes a reaction from the orifice 2 to the wire 9, and thus, the wire 9 receives a stress, but the stress is reduced by the deformation of the sealing portion 5.

In this way, since the sealing portion 5 of the moving valve body 3b is formed of the elastic material, it can serve as a cushion to reduce the overload acts on the wire 9 by contraction for the overload, and thus, it is possible to reduce the stress acting on the wire 9. Therefore, the moving valve body 3b has the elastic member for reducing the stress in this embodiment, so that it is possible to reduce a number of elements simultaneously to obtain the same advantageous effects as those in the above mentioned embodiments.

Subsequently, compact valves in accordance with a fourth embodiment are described with reference to FIGS. 5(a), 5(b) and 5(c). These figures are respectively show different examples. The compact valves 10 in this embodiment are essentially the same as those in the above mentioned embodiments, but moving valve bodies (moving structures) 3c, 3d and 3e reach comprise a spring member.

In the example shown in FIG. 5(a), the moving valve body (moving structure) 3c comprises a moving portion 4a of a cylindrical shape having a cylindrical column portion 45 at a front end thereof, a sealing portion 5 to seal an orifice 2 provided at a front end of the cylindrical column portion 45, an electrode supporting plate 13 that supports a moving electrode 12, and a coil spring (spring member) 7a that is provided between the electrode supporting plate 13 and an end of the moving portion 4c. The moving valve body 3c has elasticity due to the coil spring 7a.

In the above mentioned configuration, when energizing the wire 9 formed of a shape memory alloy to fever, the wire 9 contracts. At this tine, a stationary electrode 11 to which an end of the wire 9 is connected cannot be moved, so that the moving electrode 12 to which the other end of the wire 9 is connected moves with the moving portion 4c with each other. By such movement, the moving portion 4c pressurizes the biasing coil 8 and the sealing portion 5 seals the orifice 2 with pressure, and thus, the orifice 2 is closed. Hereupon, an elastic coefficient k1 of the biasing coil 8 is selected to be larger than an elastic coefficient k2 of the coil spring 7a. Thereby, the biasing coil 8 contracts earlier than the coil spring 7a, so that the coil spring 7a rarely contracts until the sealing portion 5 contacts the orifice 2.

After sealing the orifice 2 by contacting of the sealing portion 5, when the wire 9 further contracts so as to pressurize the sealing portion 5 with the orifice 2 for sealing more tightly and the biasing coil 8 cannot be contracted moreover, the coil spring 7a starts to be contracted. Besides, the opening operations of the orifice 2 by stopping the energization to the wire 9 are the same as those as mentioned above.

In this way, since the coil spring 7a is provided on the moving valve body 3c, the moving valve body 3c serves as an elastic member that varies an overall length thereof by pressure. When overload acting on, it serves as a cushion to reduce the overload acting on the wire 9 by contracting the coil spring 7a, so that the moving valve body 3c can serve as the elastic member to reduce the overload. Then, the same advantageous effects as those in the above mentioned embodiments can be obtained.

In the example shown in FIG. 5(b), the moving valve body (moving structure) 3b comprises a coil spring (spring member) 7b in a wall at a center of the moving body 4d (SIC). Specifically, the moving valve body 3d comprises the moving portion 4d that the coil spring 7b is built in the wall at the center thereof. An elastic coefficient k2 of the coil spring 7b is selected to be smaller than an elastic coefficient k1 of the biasing coil 8, so that the biasing coil 8 contracts earlier, and thus, the coil spring 7b rarely contracts until the sealing portion 5 contacts the orifice 2.

In this example, since the moving portion 4d has elasticity, the moving valve body 3d serves as an elastic member that varies an overall length thereof by pressure. Thus, the moving valve body 3d serves as a cushion to reduce overload acting on the wire 9, so that the overload acting on the wire 9 can be reduced. In addition, since the coil spring 7b is integrally built in the moving portion 4d, it is possible to configure a compact moving valve body 3d and enables to downsize the whole of the valve.

In the example shown in FIG. 5(c), the moving valve body (moving structure) 3e comprises a coil spring (spring member) 7a between a cylindrical column portion 45 of a moving portion 4c and a sealing portion 5. Specifically, the moving portion 4c of (SIC) the moving valve body 3e comprises the moving portion 4c of a cylindrical shape having a cylindrical column portion 45 at an end thereof, a sealing portion 5 connected to an end of the cylindrical column portion 45 and sealing the orifice 2, and a coil spring 7a for reducing stress that is provided between the sealing portion 5 and the cylindrical column portion 45. In this way, it is possible to form the moving valve body 3e compact by integration of the coil spring 7a with the sealing portion 5 of the moving portion 4c. In addition, an overload in closing operation from the orifice 2 can be received by the coil spring 7a directly through the sealing portion 5 earlier than the moving portion 4c. Accordingly, even when the moving portion 4c has a slow response to transmit pressure against the overload because it is formed of a resin or the like, a function to reduce the overload can be obtained quickly by the coil spring 7a. Thus, the moving valve body 3e can serve as a cushion to reduce the overload directly acting on the wire 9 and can increase the response to reduce the stress to the wire 9.

Figure 6:
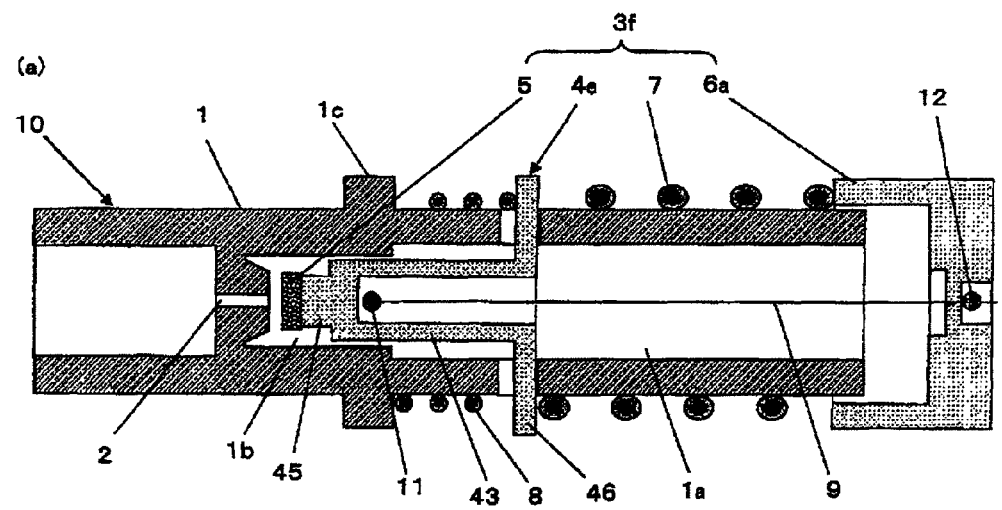
FIG. 6($a$) is a sectional view of a compact valve in accordance with a fifth embodiment of the present invention, and FIG. 6($b$) is a sectional view of the same valve in closing operation of the valve.
Figure 6:
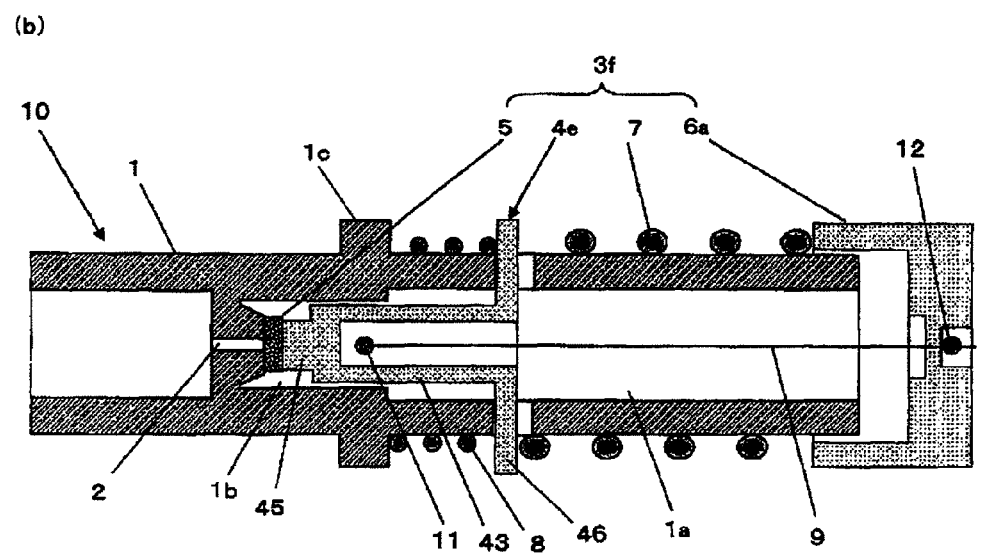

Subsequently, a compact valve in accordance with a fifth embodiment of the present invention is described with reference to FIGS. 6(a) and 6(b). In this embodiment, a coil spring 7 and a biasing coil 8 that constitute a moving valve body 3f are disposed to contact an outer periphery of a guide pile (stationary structure) 1.

The guide pipe 1 comprises a main cavity 1a, a little cavity 1b that extends from the main cavity 1a to an orifice 2 so as to include the orifice 2, and a stopper 1c for the biasing coil (first elastic member) 8 that contacts on the outer periphery of the guide pipe 1. The moving valve body 3f comprises a first moving portion 4e that contacts an inner periphery of the little cavity 1b of the guide pipe 1, a second moving portion 6a that contacts the outer periphery of the guide pipe 1, a sealing portion (sealing member) 5 that is provided at an end of the first moving portion 4e in a side of the orifice 2 for sealing the orifice 2, and the coil spring (second elastic member) 7 that is provided between the first moving portion 4e and the second moving portion 6a and contacts the outer periphery of the guide pipe 1.

The first moving portion 4e is formed of a metal or a resin, and comprises a main cylinder portion 43 that contacts an inner periphery of the little cavity 1b of the guide pipe 1, a cylindrical column portion 45 that extends from the main cylinder portion to the orifice 2, and a protruding portion 46 that is partially protruding outward of the guide pipe 1 from a rear end of the main cylinder portion 43. The biasing coil 8 that contacts the outer periphery of the guide pipe 1 is disposed between the protruding portion 46 and the stopper 1c of the guide pipe 1.

The second moving portion 6a is formed of a metal or a resin, and seals an end of the guide pipe 1 with contacting the outer periphery of the guide pipe 1, and a moving electrode 12 is provided on a rear end thereof for energizing the wire 9. The coil spring 7 that contacts the outer periphery of the guide pipe 1 and reduces a stress to the wire 9 of the shape memory alloy in heating is provided between a front end face of the second moving portion 6a and the protruding portion 46. In addition, an elastic coefficient k2 of the coil spring 7 is selected to be smaller than an elastic coefficient k1 of the biasing coil 8.

In the above mentioned configuration, when the wire 9 formed of the shape memory alloy is energized to fever, the wire 9 contracts and the second moving portion 6a is pulled toward the orifice 2, so that the coil spring 7 contacting the second moving portion 6a is pressurized. The pressure does not compress the coil spring 7 having a smaller elastic coefficient k2, but is transmitted to the first moving portion 4e through the coil spring 7, and thus, the biasing coil 8 having a larger elastic coefficient k1 is compressed due to the pressure from the first moving portion 4e. Consequently, the sealing portion 5 at the front end of the first moving portion 4e stops at a state of sealing the orifice 2 in a state shown in FIG. 6(b) from a state shown in FIG. 6(a).

After closing the orifice 2 by contacting of the sealing portion 5, when the contraction of the wire 9 further proceeds and the sealing portion 5 further pressurizes the orifice 2 for sealing more tightly, a reaction force from the orifice 2 acts on the wire 9 as an overload. At this time, the coil spring 7 starts to contract, so that the overload acting on the wire 9 is reduced. Besides, the opening operations of the orifice 2 by stopping the energization to the wire 9 are the same as those as mentioned above.

In this way, since the coil spring 7 and the biasing coli 8 are provided to contact the outer periphery of the guide pipe 1, these spring portions are arranged within an overall length of the moving valve body 3f, and thus, it is possible to downsize the compact valve 10 entirely. In addition, since the wire 9 can be configured without penetrating through the spring portions, manufacture of the valve 10 becomes easier. Moreover, since the moving valve body 3f has elasticity as a whole, it can serve as a cushion to reduce the overload acting on the wire 9, and thus, the overload for the shape memory alloy can be reduced.

Figure 7:
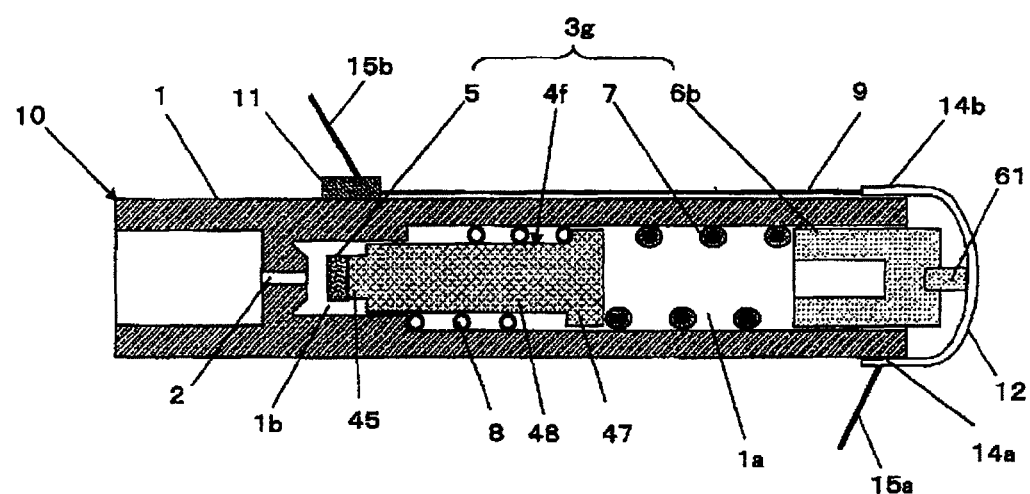
FIG. 7($a$) is a sectional view of a compact valve in accordance with a sixth embodiment of the present invention, and FIG. 7($b$) is a sectional view of the same valve in closing operation of the valve.
Figure 7:
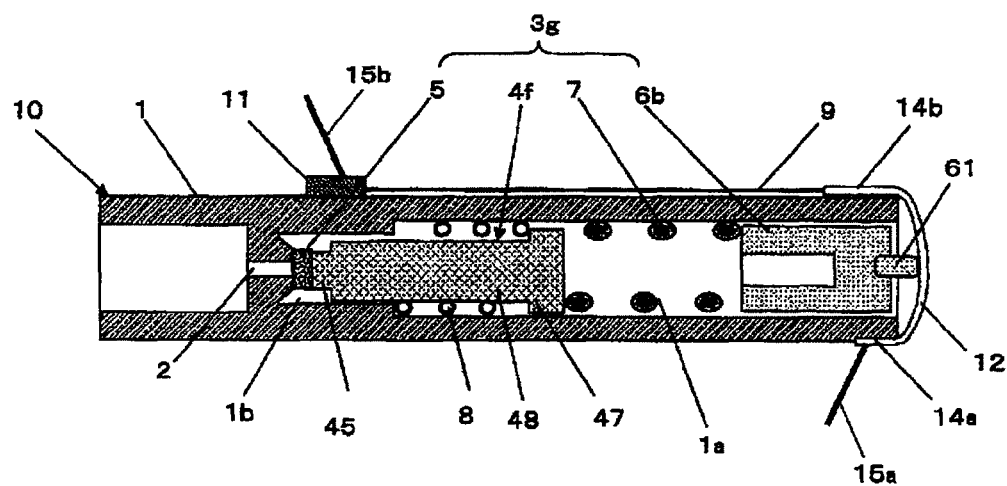

Subsequently, a compact valve in accordance with a sixth embodiment of the present invention is described with reference to FIGS. 7(a) and 7(b). In this embodiment, an end of a moving electrode (second electrode) 12 is connected to a guide pipe 1, and a moving valve body 3g is moved by warping of the moving electrode 12 due to contraction of a wire 9.

The guide pipe 1 has a main cavity 1a to which the moving valve body 3g contacts internally, and a little cavity 1b that extends from the main cavity 1a toward an orifice 2. The moving valve body 3g comprises a first moving portion 4f that contacts an inner periphery of the guide pipe 1, a second moving portion 6b that contacts the inner periphery of the guide pipe 1 and pressurized by contacting the moving electrode 12, a sealing portion (sealing member) 5 that is provided at a front end of the first moving portion 4f and seals the orifice 2, and a coil spring 7 for supplying elasticity to the moving valve body 3g. A biasing coil 8 that contacts an outer periphery of the moving valve body 3g is provided in the guide pipe 1. A lead wire 15b and a lead wire 15a are respectively connected to a stationary electrode 11 and the moving electrode 12.

The first moving portion 4f is formed of a metal or a resin, and comprises a main cylindrical column portion 48 that contacts an inner periphery of the little cavity 1b of the guide pipe 1, a cylindrical column portion 45 that extends from the main cylindrical column portion 48 toward a front end side, and a second cylindrical column portion 47 that contacts the inner periphery of the guide pipe 1 at an end of the main cylindrical column portion 48.

The second moving portion 6b is formed of a metal or a resin, contacts the inner periphery of the guide pipe 1 and has a protruding portion 61 that contacts the moving electrode 12. The moving electrode 12 has a fixed end 14a that is fixed on the guide pipe 1 and a moving end 14b connected to an end of the wire 9 other than an end connected to the stationary electrode 11, and the moving end 14b is moved by contraction of the wire 9. The fixed end 14a and the moving end 14b are respectively disposed at an upper portion and a lower portion on the outer periphery on a rear end of the guide pipe 1 into which the second moving portion 6b is inserted. The moving electrode 12 between the fixed end 14a and the moving end 14b is bowed so that it is warped by pulling of the wire 9 and pushes the protruding portion 61. The coil spring (second elastic member) 7 is provided between the first moving portion 4f and the second moving portion 6b so as to reduce a stress acting on the wire 9 of the shape memory alloy in heating. An elastic coefficient k2 of the coil spring 7 is selected to be smaller than an elastic coefficient k1 of the biasing coil 8.

In the above mentioned configuration, when the wire 9 is energized through the lead wire 15a, the lead wire 15b, the stationary electrode 11 and the moving electrode 12, the moving electrode 12 is pulled toward the stationary electrode 11 by the contraction of the wire 9 corresponding to fever thereof, so that the protruding portion 61 of the second moving portion 6b is pressurized by a center portion of the moving electrode 12. The second moving portion 6b is moved toward the orifice 2 by such pressure, so that the coil spring 7 and the first moving portion 4f which are serially contacted to the second moving portion 6b with pressure move to seal the orifice 2 by the sealing portion 5 as shown in FIG. 7(b) from a state shown in FIG. 7(a). The biasing boil 8 is contracted until the sealing portion 5 contacts the orifice 2.

After closing the orifice 2 by contacting of the sealing portion 5, when the contraction of the wire 9 further proceeds and the sealing portion 5 further pressurizes the orifice 2 so as to seal more tightly, a reaction force from the orifice 2 acts on the wire 9 as an overload. At this time, the coil spring 7 starts to contract, so that the overload to the wire 9 can be reduced.

In this way, since the coil spring 7 is provided between the first moving portion 4f and the second moving portion 6b, the moving valve body 3g has elasticity as a whole, and thus, overload can be reduced. In addition, since the moving electrode 12 has the fixed end 14a, it is possible to increase strength of connecting portion between the lead wire 15a for energization and the moving electrode 12.

Subsequently, a compact valve in accordance with a seventh embodiment of the present invention is described with reference to FIGS. 8(a) and 8(b). In this embodiment, it is configured that a first stationary electrode (first electrode) 11a and a second stationary electrode (second electrode) 12a, which are respectively fixed on an upper portion and a lower portion of an end of a guide pipe (stationary structure) 1, are comprised; a wire 9 formed of a shape memory alloy is connected between these electrodes 11a and 12a; a moving valve body 3h is pressurized by a center portion of the wire 9; and a contraction direction of the wire 9 crosses at right angle with a moving direction of the moving valve body 3h.

An end face of the guide pipe 1 opposite to an orifice 2 is opened and a flange 1d is formed on the end face. The first stationary electrode 11a and the second stationary electrode 12a are fixed at the upper portion and the lower portion of the flange 1d by a resin adhesive or welding. A biasing coil 8 is provided to contact an outer periphery of the moving valve body 3h in the guide pipe 1. The moving valve body 3h comprises a first moving portion 4g that contacts the inner periphery of the guide pipe 1, a second moving portion 6c that contacts the inner periphery of the guide pipe 1 and contacts the wire 9 at a rear end thereof, a sealing portion (sealing member) 5 provided at a front end of the first moving portion 4g so as to seal the orifice 2, and a coil spring 7 that is provided between the first moving portion 4g and the second moving portion 6c and supplies elasticity to the moving valve body 3h.

The first moving portion 4g is formed of a metal or a resin, and comprises a first cylindrical column portion 41 that contacts the inner periphery of the guide pipe 1, and a second cylindrical column portion 42 that extends from the first cylindrical column portion 41 toward a front end side. The second cylindrical column portion 42 has a sealing portion 5 at a front end thereof to seal the orifice 1. A biasing coil 8 is provided on the second cylindrical column portion 42 so as to contact externally, so that it pressurizes the first moving portion 4g so as not to close the orifice 2 by the sealing portion 5 when the wire 9 is not energized. An elastic coefficient k2 of the coil spring is selected to be smaller than an elastic coefficient k1 of the biasing coil 8.

The second moving portion 6c has a first cylindrical column portion 61 that contacts the inner periphery of the guide pipe 1 and a second cylindrical column portion 63 that extends from the first cylindrical column portion 62 toward a front end side. A contacting portion 64 of a cylindrical shape is provided at a center portion of the first cylindrical column portion 62 so as to be pressurized by contacting with a center portion of the wire 9. The contacting portion 64 is freely rotatable, and moved by a pressure in an axial direction of the guide pipe 1 due to contraction and expansion of the wire 9. Consequently, the second moving portion 6c is moved along the guide pipe 1 by pressure in a vertical direction of the expansion and contraction of the wire 9.

Figure 8:
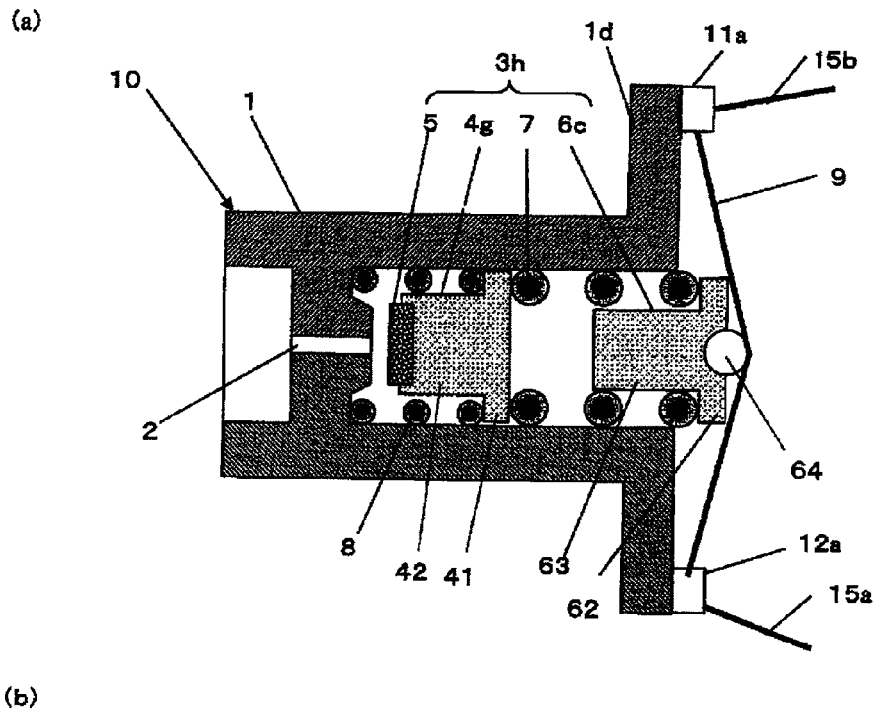
FIG. 8($a$) is a sectional view of a compact valve in accordance with a seventh embodiment of the present invention, and FIG. 8($b$) is a sectional view of the same valve in closing operation of the valve.
Figure 8:
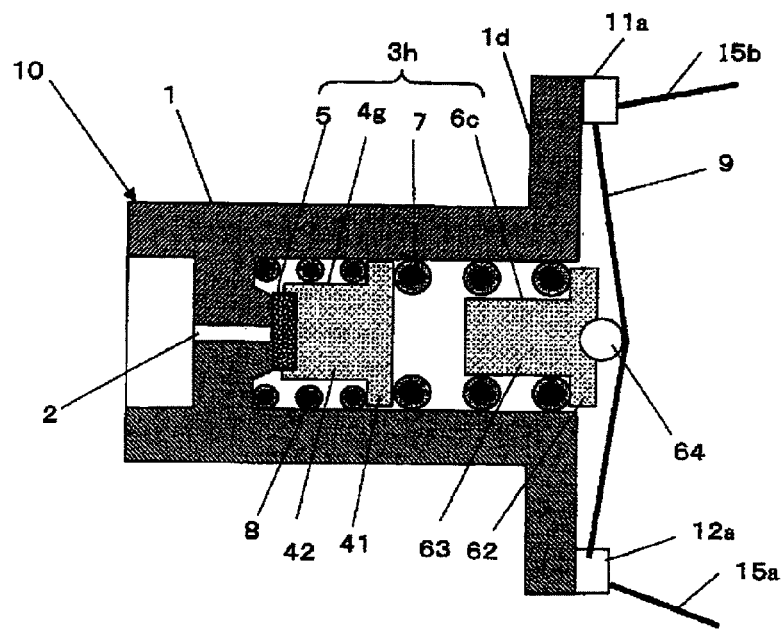

In the above mentioned configuration, when the wire 9 contracts by heat due to energization, the contacting portion 64 of the second moving portion 6c is pressurized toward the orifice 2, so that whole of the moving valve body 3h is moved toward the orifice 2 from a state shown in FIG. 8(a) and stops the movement when the sealing portion 5 contacts the orifice 2 as shown in FIG. 8(b). When the wire 9 further contracts so as to press the orifice 2 by the sealing portion 5, the biasing coil 8 having a larger elastic coefficient is contracted earlier, and a reaction force from the orifice 2 acts on the moving valve body 3h, subsequently. Therefore, although a load acts on the wire 9, the moving valve body 3h including the coil spring 7 has elasticity, so that the overload acting on the wire 9 can be reduced.

In this way, since the contraction force of the wire 9 is converted to the moving direction of the moving valve body 3h perpendicular to the contraction direction, a stroke that enables to displace the moving valve body 3h largely can be obtained by a minute contraction of the wire 9. Therefore, an overall length of the wire 9 for the necessary stroke of the moving valve body 3h can be shortened. In addition, since the electrodes to which both ends of the wire 9 are connected are fixed, reliability of connection of the lead wires 15a and 15b for energization can be increased.

Figure 9:
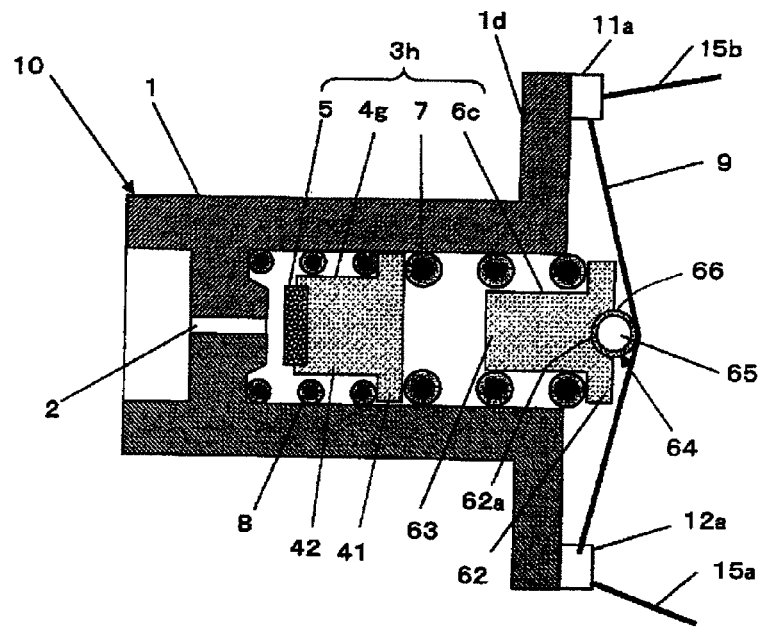
FIG. 9 is a sectional view of a compact valve in accordance with an eighth embodiment of the present invention.

Subsequently, a compact valve in accordance with an eighth embodiment of the present invention is described with reference to FIG. 9. This embodiment is essentially the same as the above mentioned seventh embodiment, but it is different that a contacting portion 64 that contacts a second moving portion 6c and a wire 9 in an end portion of a moving valve body 3h is configured by a metal member (metal) 65 with a surface coating 66 of a resin having a low heat conductivity. As for a material of the resin coating 66, it is preferable to have good heat resistance, wear resistance and lubricating property, such as PTFE resin.

A groove 62a having a substantially the same radius of the contacting portion 64 and a semicircle cross section is provided on a first cylindrical column portion 62 of a second moving portion 6c of the moving valve body 3h in a direction substantially perpendicular to the wire 9. About a half of the circular section of the contacting portion 64 internally contacts the groove 62a. Since the contacting portion 64 contacts both of the second moving portion 6c and the wire 9, heat generated in the wire 9 by energization may be conducted to a guide pipe 1 from the wire 9 through the contacting portion 64, the second moving portion 6c and a coil spring 7, and thus, it may easily be radiated. Such heat radiation of the wire 9 is not desirable because it may cause the reduction of contraction efficiency of the shape memory alloy for the energization.

Then, in this embodiment, thermal insulation advantageous effect due to resin coating is realized by coating a surface of the metal member 65 which constitutes the contacting portion 64 with the resin coating 66. By such a configuration, heat conduction from the wire 9 to the contacting portion 64 can be reduced, and heat radiation of fever of the wire 9 by energization can be restrained. Consequently, the contraction efficiency of the wire 9 for energization can be increased, and moving response of the moving valve body 3h can be fastened, and thus, response to the energization of the valve switching can be increased. In addition, although the contacting portion 64 receives strong pressure due to contraction of the wire 9, the contacting portion 64 is hard and strong because it is configured of a metal member 65, so that the pressure from the wire 9 can be transmitted to the moving valve body 3h directly, and thus, transmission efficiency of the pressure can be increased. Although whole of the contacting portion 64 may be formed of a resin, the resin having good heat resistance, wear resistance and lubricating property is expensive. Thus, the contacting portion 64 can be manufactured inexpensive by forming the contacting portion 64 of a metal in this embodiment.

Figure 10:
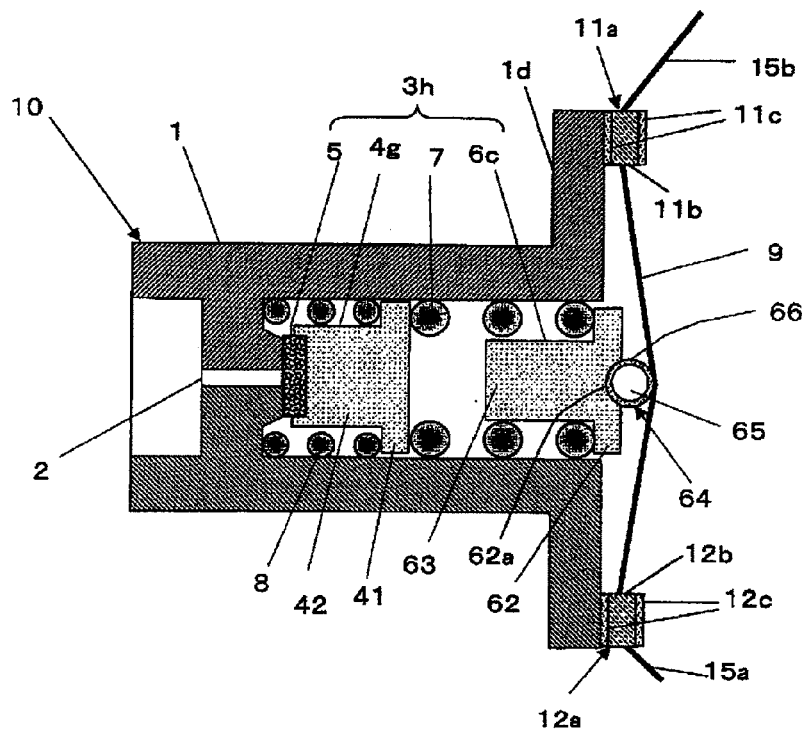
FIG. 10 is a sectional view of a compact valve in accordance with a ninth embodiment of the present invention.

Subsequently, a compact valve in accordance with a ninth embodiment of the present invention is described with reference to FIG. 10. This embodiment is essentially the same as the above mentioned embodiments, but it is different that resin coatings 11c and 12c are provided on surfaces of a first electrode 11a and a second electrode 12a (SIC).

The first stationary electrode 11a and the second stationary electrode 12a are respectively configured by metal members 11b and 12b each of which is a rectangular solid, and the resin coatings 11c and 12c that coat surfaces at least contacting faces of the surfaces of the metal members 11b and 12b with a flange 1d. The first stationary electrode 11a and the second stationary electrode 12a coated by resin are fixed on the flange 1d by a resin adhesive or the like.

In such a configuration, heat generated by fever of a wire 9 due to energization might be conducted and radiated from the wire 9 to a guide pipe 1 through the first stationary electrode 11a and the second stationary electrode 12a. However, since the surfaces of the first stationary electrode 11a and the second stationary electrode 12a are coated by resin in this embodiment, heat conduction can be reduced by heat insulation effect of the resin. Consequently, heat radiation of the wire 9 can be restrained. Therefore, contraction efficiency of the wire 9 for energization can be increased and the moving response of the moving valve body 3h can be increased.

Figure 11:
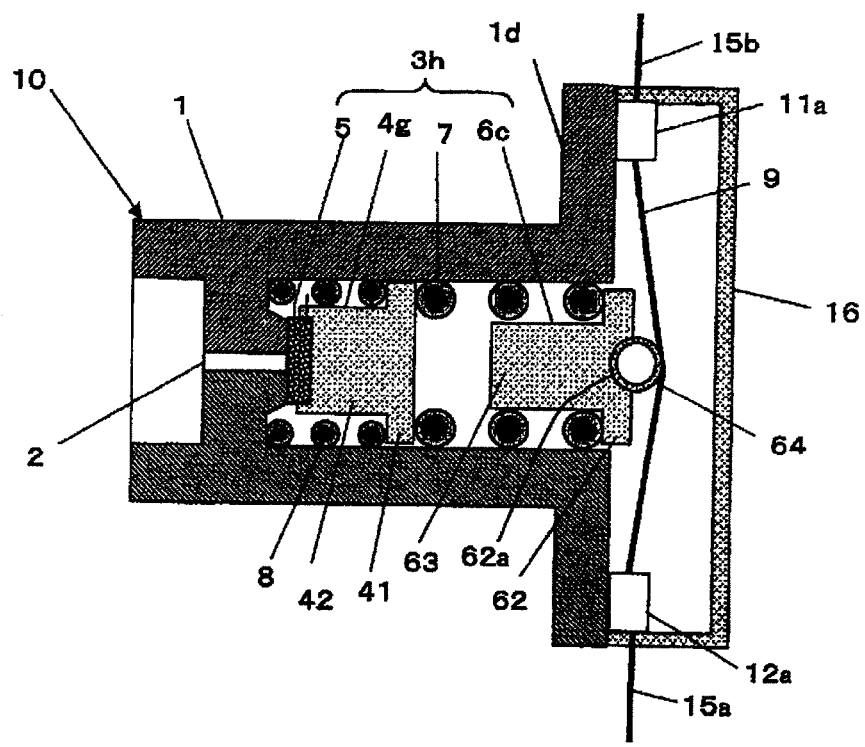
FIG. 11 is a sectional view of a compact valve in accordance with a modification of the eighth embodiment of the present invention.

A modified example of the above mentioned eighth embodiment is described with reference to FIG. 11. In this modified example, the first stationary electrode 11a, the second stationary electrode 12a, and the wire 9 held by the stationary electrodes 11a and 12a are covered by a cover 16 that is provided on the flange 1d.

The cover 16 consists of a housing formed of a resin having low heat conductivity, and fixed on the flange 1d by a resin adhesive or the like so as to seal the first stationary electrode 11a, the second stationary electrode 12a and the wire 9. By such a configuration, the first stationary electrode 11a, the second stationary electrode 12a and the wire 9 are insulated from outer air. By such insulation, heat radiation from the wire 9 that fevers due to energization and from the first stationary electrode 11a and the second stationary electrode 12a that are heated by heat conduction from the wire 9 are restrained. Therefore, contraction efficiency of the wire 9 for energization can be increased and the moving response of the moving valve body 3h can be increased.

Figure 12:
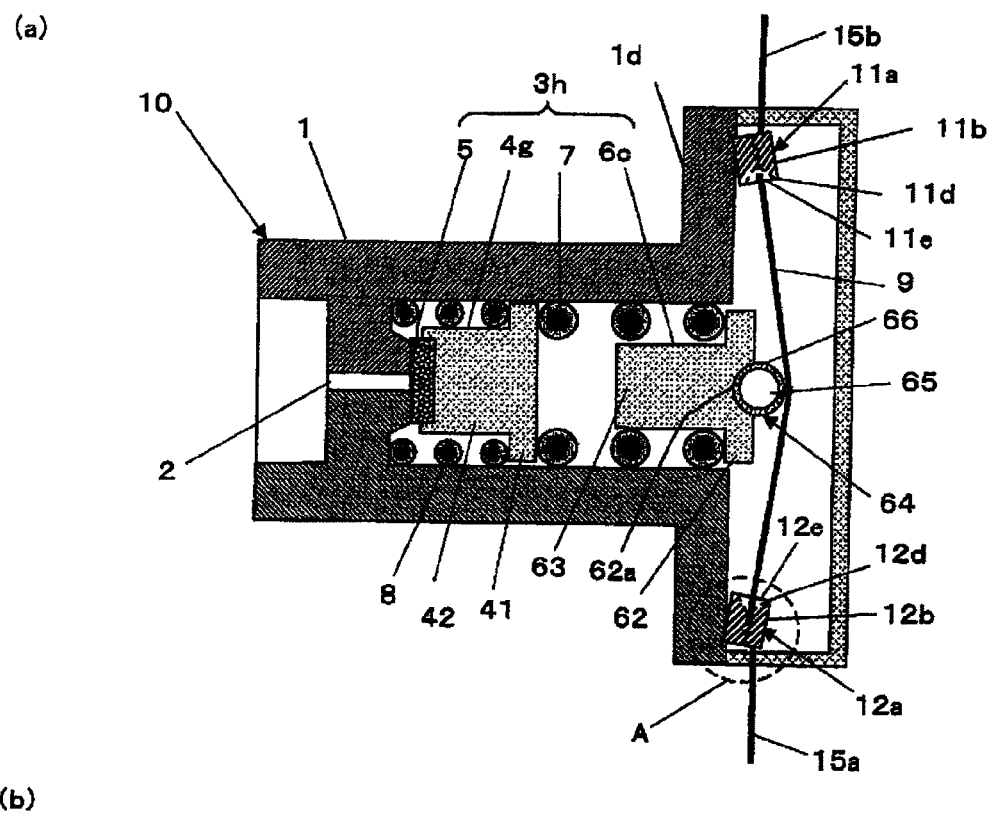
FIG. 12($a$) is a sectional view of a compact valve in accordance with a modification of the eighth embodiment of the present invention.
Figure 12:
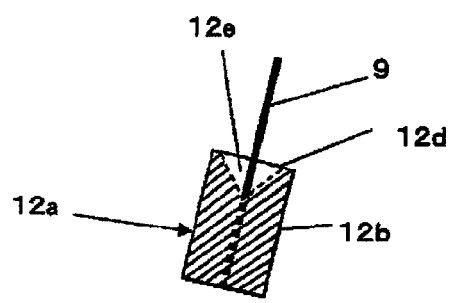

Another modified example of the above mentioned eighth embodiment is described with reference to FIGS. 12(a) and 12(b). In this modified example, deburred holes 11e and 12e are formed by deburring the vicinities of openings of wire drawing holes 11d and 12d of the first stationary electrode 11a and the second stationary electrode 12a provided on the flange 1d of the guide pipe 1, from which the wire 9 connected to the stationary electrodes 11a and 12a are drawn out. The deburred holes 11e and 12e are formed by carving the electrodes to have a reverse triangular section from surfaces in the vicinities of the openings. The stationary electrodes 11a and 12a are formed of metal members 11b and 12b each having a rectangular cross section and both ends of the wire 9 are fixed in the metal members 11b and 12b by welding or the like. In addition, the metal members 11b and 12b are arranged on a surface of the flange 1d with inclination so that the wire drawing holes 11d and 12d coincide with drawing directions of the wire 9. In addition, the stationary electrodes 11a and 12a are symmetrically fixed on the flange 1d by welding, resin adhesive, or the like.

In this modified example, the deburred holes 11e and 12e are formed on the wire drawing holes 11d and 12d, so that it is possible to reduce opportunities to contact the wire drawing holes 11d and 12d of the metal members 11b and 12b with the wire 9 that displaces corresponding to contraction and expansion. Consequently, contact friction of the wire 9 can be reduced, and thus, it is possible to prevent braking of the wire 9. In addition, the directions for drawing the wire 9 substantially coincide with the direction of the wire drawing holes 11d and 12d of the metal members 11b and 12b, so that the wire 9 rarely contacts the metal members 11b and 12b.

By the compact valves 10 in accordance with the above mentioned embodiments and the modified examples thereof, since the coil spring 7 for reducing stress is provided on the moving valve body 3 and the elastic coefficient k2 of the coil spring 7 is selected to be smaller than the elastic coefficient k1 of the biasing coil 8, the stress that receives the wire 9 due to the reaction force from the orifice 2 can be absorbed in closing operation of the orifice 2 due to contraction of the wire 9. By such cushion effect of the moving valve body 3, the overload to the shape memory alloy in the closing operation of the valve due to energization and heating can be reduced. Therefore, the transformation of the memorized shape of the shape memory alloy and deterioration of repeatability of the memorized shape due to the overload can be prevented, and the durability of the shape memory alloy can be increased.

Figure 13:
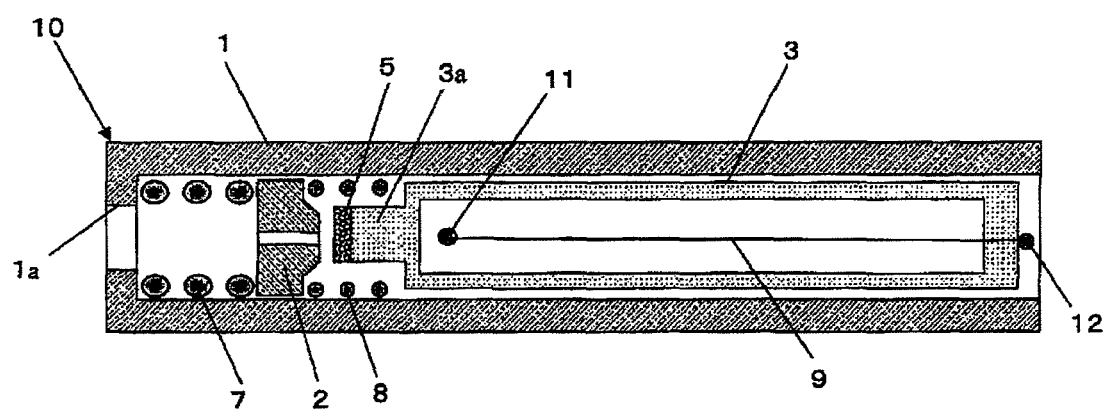
FIG. 13 is a sectional view of a compact valve in accordance with a tenth embodiment of the present invention.
Figure 14:
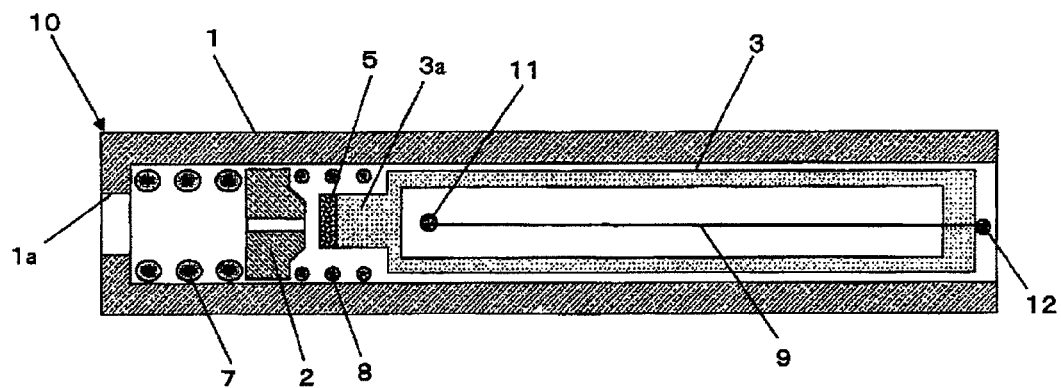
FIGS. 14(a) and 14(b) are respectively sectional views of the above mentioned valve in opening operation and closing operation of the valve.
Figure 14:
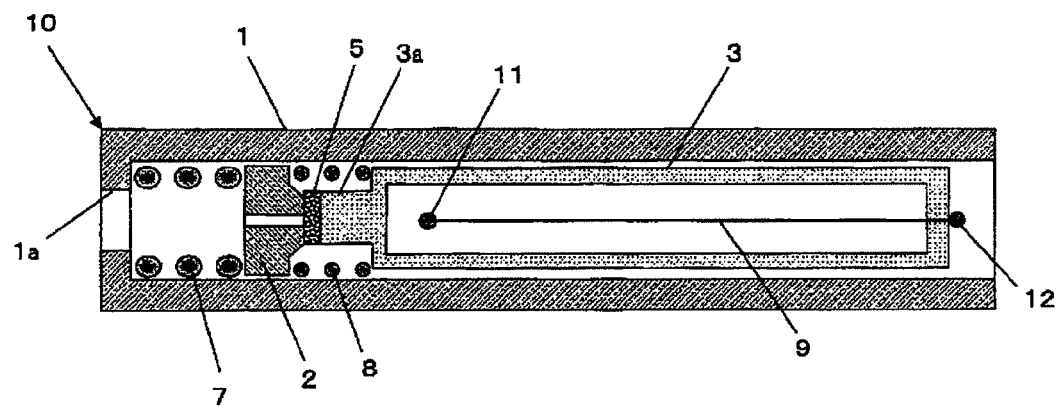

Subsequently, a compact valve in accordance with a tenth embodiment of the present invention is described with reference to FIG. 13 and FIGS. 14(a) and 14(b). In the compact valve 10 of this embodiment, an orifice (orifice member) 2 is independently provided from a guide pipe (stationary structure) 1 so that it can freely movable in the guide pipe 1. In addition, a biasing coil (first elastic member) 8 for biasing against a wire 9 formed of a shape memory alloy contacts an inner periphery of the guide pipe and is provided between a moving valve body (moving structure) 3 and the orifice 2. Furthermore, a coil spring 7 for reducing a stress to the shape memory alloy in heating process is provided between the orifice 2 and an end 1a (opposite end to the orifice) of the guide pipe 1. The wire 9 is held between a stationary electrode 11 and a moving electrode 12.

The moving valve body 3 has a cylindrical column portion 3a that extends from a main cylinder portion internally contacting the guide pipe 1 toward the orifice 2, and a sealing portion (sealing member) 5 formed of a resin or a rubber to seal the orifice 2 is provided on a front end of the cylindrical column portion 3a. As for the shape memory alloy, one that contracts when a temperature thereof becomes higher than a certain value by heating due to energization is used. When a DC voltage is applied to energize the shape memory alloy, it fevers and the temperature thereof rises, so that it returns to a previously memorized contracted shape above the certain temperature value. In addition, an elastic coefficient k2 of the coil spring 7 is selected to be smaller than an elastic coefficient k1 of the biasing coil 8, as described later, so that a space is formed between the orifice 2 and the sealing portion 5 due to the biasing coil 8 at a normal temperature, and thus, the orifice 2 is opened (normally open).

In the above mentioned configuration, when the wire 9 is energized, the wire 9 fevers, and when the temperature thereof becomes higher than the certain value, the wire 9 contracts to transform the memorized shape. At this time, an end of the wire 9, which is connected to the stationary electrode 11 fixed on the guide pipe 1, is not movable, so that the other end of the wire 9, which is connected to the moving electrode 12 provided on the moving valve body 3, is pulled and moves with the moving valve body 3. Thus, the moving valve body 3 moves toward the orifice 2 by contraction of the wire 9, and the biasing coil 8 is pressurized and contracted by such movement, so that the biasing coil 8 is pressurized to the orifice 2. The sealing portion 5 at the front end of the moving valve body 3 contacts the orifice 2 and stops the movement in a state of sealing the orifice 2. Thereby, the orifice 2 is closed from a state shown in FIG. 14(a) to a state shown in FIG. 14(b). At this time, the elastic coefficient k2 of the coil spring 7 is selected to be smaller than the elastic coefficient k1 of the biasing coil 8, so that the biasing coil 8 is compressed and the coil spring 7 rarely contracts until the orifice 2 is sealed by the sealing portion 5. Opening operations of the orifice 2 by stopping the energization to the wire 9 are the same as those as described above.

After sealing the orifice 2 by contacting of the sealing portion 5, when the wire 9 further contracts and the sealing portion 5 pressurizes the orifice 2 so as to seal more tightly, the biasing coil 8 is pressurized between the orifice 2 and the moving valve body 3 in the guide pipe 1 and it cannot be compressed any more. The coil spring 7 starts contraction at this time instead of the biasing coil 8.

The contraction of the coil spring 7 serves as a cushion to reduce overload applied to the wire 9 directly, and thus, an excess load to the wire 9 can be reduced. Thus, the overload to the shape memory alloy can be avoided, so that it is possible to prevent transformation of the memorized shape of the wire 9 at the higher temperature, and thus, the shape memory alloy can return to the original memorized shape at any time. In addition, it is possible to prevent deterioration with age of the memorized shape due to repetition of the overload, to increase the durability, and to perform open and close of the orifice 2 by energization to the wire 9 accurately.

According to this embodiment, the orifice 2 that is independently movable in the guide pipe 1, the biasing coil 8 provided between the orifice 2 and the moving valve body 3, and the coil spring 7 provided between the end portion 1a of the guide pipe 1 and the orifice 2 are arranged in series, and the elastic coefficient k1 of the biasing coil 8 is selected to be larger than the elastic coefficient k2 of the coil spring 7, so that the coil spring 7 can be deformed elastically due to the overload for the wire 9 in the closing operation of the orifice 2. Thereby, the overload of contraction stress for the shape memory alloy of the wire 9 in energization can be reduced, and thus, the durability is increased by preventing the deterioration of the repeatability of the memorized shape of the shape memory alloy, and consequently, the reliability of the compact valve 10 can be increased. Furthermore, the orifice 2 is independently provided from the guide pipe 1 without integration, so that freedom for arranging elements in the guide pipe 1 can be increased, manufacturing of the orifice 2 that needs microfabrication becomes easier, and degree of accuracy is increased. Still furthermore, since the wire 9 can be formed as a fine straight shape instead of a thick coil shape, it is possible to downsize the valve that occupies as little space as possible, and response to heat radiation of the shape memory alloy can be made faster.

Subsequently, a compact valve in accordance with an eleventh embodiment of the present invention is described with reference to FIGS. 15(a), 15(b) and 15(c). In the compact valve 10 of this embodiment, a first semi-stationary electrode (first electrode) 11f has a plate spring structure that integrates an overload reduction elastic member (second elastic member) 11h (hereinafter, abbreviated as "spring portion"), and a second semi-stationary electrode (second electrode) 12f has a plate spring structure that integrates a biasing elastic member (first elastic member) 12h (hereinafter, abbreviated as "spring portion"). Hereupon, the first semi-stationary electrode 11f is fixed on a guide pipe 1 at an end thereof, and the second semi-stationary electrode 12f is fixed on the guide pipe 1 at an end thereof and contacts a moving valve body 3 at the other end thereof so as to cooperate.

The first semi-stationary electrode 11 is configured of an L-shaped plate spring, and has a stationary end portion 11g fixed on the guide pipe 1 and a spring portion 11h that is bent from the stationary end portion 11g and inserted into the moving valve body 3. The spring portion 11h is disposed near to an end portion 35 of a main cylinder portion 31 of the moving valve body 3 in a side of an orifice 2. The second semi-stationary electrode 12 is configured of an L-shaped plate spring, and has a stationary end portion 12g fixed on the guide pipe 1 and a spring portion 12h that is bent from the stationary end portion 12g and inserted into the moving valve body 3. The spring portion 12h is disposed to contact an end portion 33 of the main cylinder portion 31 of the moving valve body 3 in a side opposite to the orifice 2. An elastic coefficient k2 of the spring portion 11h of the first semi-stationary electrode 11f is selected to be smaller than an elastic coefficient k1 of the spring portion 12h of the second semi-stationary electrode 12f. The spring portion 11h and the spring portion 12h are respectively connected to both ends of a wire 9. A distance between the spring portion 11h and the spring portion 12h is substantially equal to a length between the end portion 35 and the end portion 33 at both ends of the main cylinder portion of the moving valve body 3 at a normal temperature, so that an allowance of movement of the moving valve body 3 is restrained.

The moving valve body 3 is formed of an elastic material such as a resin or a rubber, and has the main cylinder portion 31 that contacts an inner periphery of the guide pipe 1, a cylindrical column portion 32 that extends from the end portion 35 of the main cylinder portion 31 in the side of the orifice 2, the end portion 33 in the side opposite to the orifice 2, a stopper 34 that stops the spring portion 12h to transmit a stress from the spring portion 12h to the moving valve body 3, and a spring insertion portion 36 of a cavity enclosed by the stopper 34 and the end portion 33 into which the spring portion 12h is inserted. A sealing portion 5 to seal the orifice 2 is provided at a front end of the cylindrical column portion 32.

Figure 15:
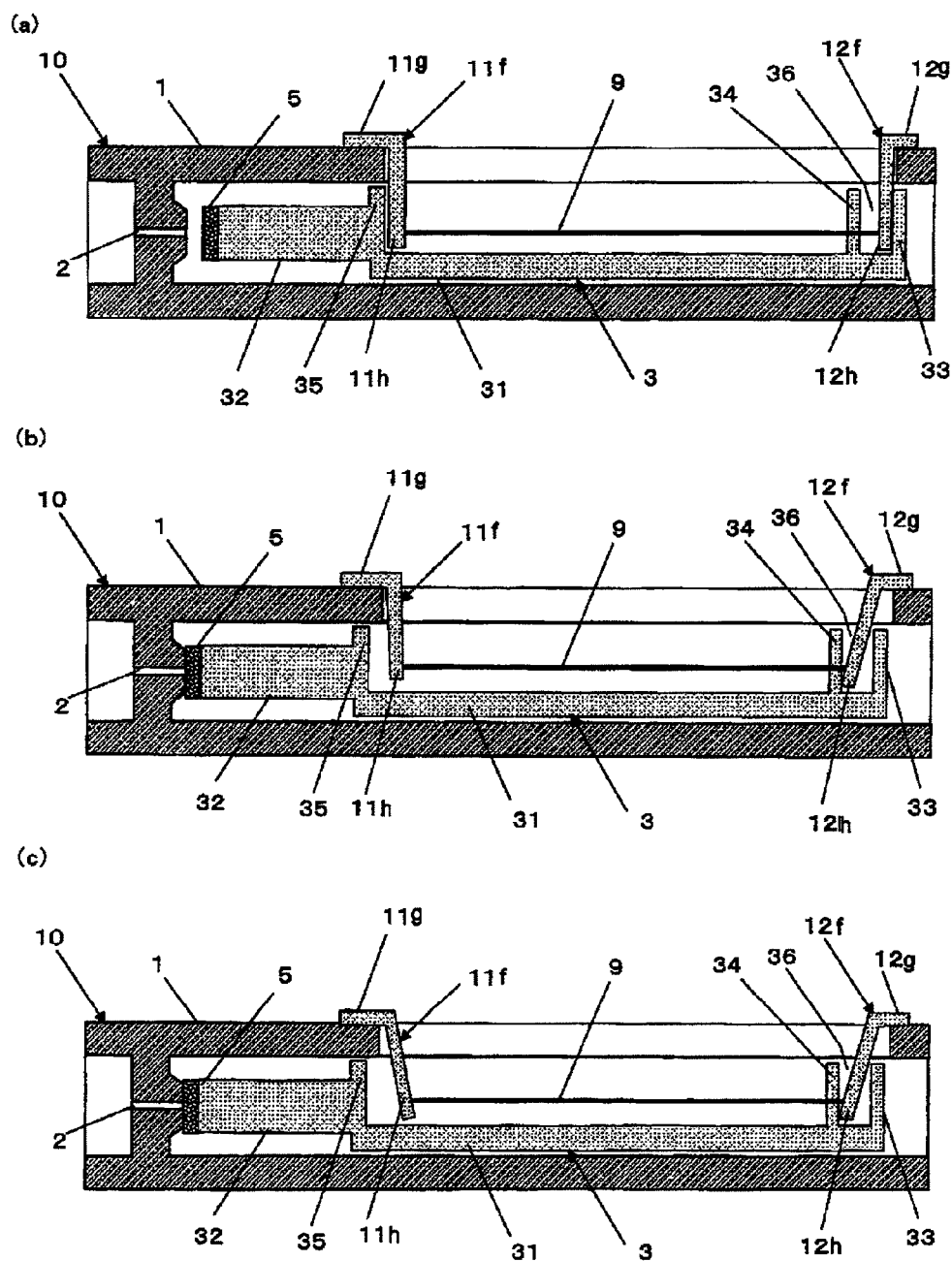
FIG. 15(a) is a sectional view of a compact valve in accordance with an eleventh embodiment in opening operation.
FIGS. 15(b) and 15(c) are respectively sectional views of the same valve in closing operation and closing operation under overload.

FIG. 15(a) shows a state that the wire 9 is not energized. In this case, the spring portion 12h of the second semi-stationary electrode 12f contacts the end portion 33 so as to press the moving valve body 3 in a direction opposite to the orifice 2. By such pressure, the sealing portion 5 at the front end of the moving valve body 3 departs from the orifice 2 so that the orifice 2 becomes an opening state at a normal temperature. In this way, the second semi-stationary electrode 12f serves as an elastic member for biasing the orifice 2, and the first elastic member is integrated to the second semi-stationary electrode 12f as an electrode for energization.

FIG. 15(b) shows a state that the wire 9 is energized. The wire 9 fevers by energization and contracts due to temperature rise. At this time, the spring portion 11h of the first semi-stationary electrode 11f to which an end of the wire 9 is connected rarely bends because the elastic coefficient k2 thereof is smaller than the elastic coefficient k1 of the spring portion 12h of the second semi-stationary electrode 12f, and the spring portion 12h mainly bends so as to be pulled toward the orifice 2. By bending of the spring portion 12h toward the orifice 2, the spring portion 12h pushes the stopper 34 of the moving valve body 3 so that the moving valve body 3 moves toward the orifice 2. When the sealing portion 5 at the front end of the moving valve body 3 contacts the orifice 2, movement of the moving valve body 3 stops approximately, and the orifice 2 is closed. In this way, the spring portion 12h contracts (SIC) earlier than the spring portion 11h, and the spring portion 11h rarely contracts (SIC) until the sealing portion 5 contacts the orifice 2.

In addition, when stopping the energization to the wire 9, the temperature of the wire degreases, and when the temperature returns to the original value, the wire 9 extends, so that the moving valve body 3 of an elastic member returns to the original position, the sealing portion departs from the orifice 2 and thus, the orifice 2 is opened.

FIG. 15(c) shows a state that the wire 9 is further energized after the sealing portion 5 contacts the orifice 2. After the orifice 2 is contacted and pressurized by the sealing portion 5, even when the wire 9 further contracts and the sealing portion 5 pressurizes the orifice 2 so as to seal more tightly, since the spring portion 12h and the stopper 34 are already contacted, the spring portion 12h cannot bend any more. At this time, the spring portion 11h starts to bend by receiving stress due to contraction of the wire 9, and thus, the spring portion 11h is pulled by the wire 9 so as to bend toward the orifice 2. By such transformation of the spring portion 11h, an overload to the wire 9 from the orifice 2 corresponding to an excess stress to the orifice due to the contraction of the wire 9 can be reduced. Hereupon, the first semi-stationary electrode 11f serves as a second elastic member for the wire 9 of the shape memory alloy, and the second elastic member is integrated with the first semi-stationary electrode 11f as an electrode for energization.

According to this embodiment, the first semi-stationary electrode 11f is configured as a spring structure having a smaller elastic coefficient, and the second semi-stationary electrode 12f is configured as a spring structure having a larger elastic coefficient, so that the first semi-stationary electrode 11f can be bent for an excess load. The first semi-stationary electrode 11f serves as a cushion to reduce the overload directly acting on the wire 9, so that the excess load to the wire 9 can be reduced. Furthermore, the first semi-stationary electrode 12f (SIC) is configured as a plate spring structure to integrate the second elastic member, and the second semi-stationary electrode 11f (SIC) is configured as a plate spring structure to integrate the first elastic member, so that a number of elements that constitute the compact valve 10 can be reduced and productivity thereof can be increased.

This application is based on Japan Patent Applications No. 2005-215601, 2006-120351 and 2005-215555, and contents of which are incorporated in this application by reference.

The invention claimed is:

1. A compact valve that opens and closes a fluid path with utilizing transformation of a shape memory alloy due to energization heating, characterized by that
the compact valve comprises:
a stationary structure of a cylindrical shape having an orifice that constitutes the fluid path;
a moving structure that contacts an inner periphery of the stationary structure, and has a sealing member freely movable to seal the orifice;
a wire formed of a shape memory alloy to move the moving structure; and
a first electrode and a second electrode to hold the wire and to energize the wire, and wherein
the moving structure is configured so that a length thereof is elastically variable, and is movable to seal the orifice by varying a length of the wire due to energization heating to the wire; and
the moving structure elastically transforms when sealing the orifice, and thereby, a stress that the wire receives can be reduced.

2. The compact valve in accordance with claim 1, wherein a part of or whole of the moving structure is formed of an elastic material.

3. The compact valve in accordance with claim 1, wherein the moving structure has a spring member.

4. The compact valve in accordance with claim 3, wherein the spring member is provided to contact an outer periphery of the stationary structure.

5. The compact valve in accordance with claim 1, wherein an end of the second electrode is fixed on the stationary structure, the other end thereof is connected to the wire, and a center portion between both of the ends contacts the moving structure, and thus, the moving structure is moved by bending of the electrode.

6. The compact valve in accordance with claim 1, wherein the first electrode is fixed on the stationary structure and the second electrode is connected to the moving structure.

7. The compact valve in accordance with claim 1, wherein the first electrode is fixed on a predetermined position on the stationary structure and the second electrode is fixed on another position other than that mentioned before on the stationary structure, a center portion between both ends of the wire pressurizes an end of the moving structure, and a direction of contraction and expansion of the wire is perpendicular to a moving direction of the moving structure.

8. The compact valve in accordance with claim 7, wherein an end of the moving structure has a contacting portion that contacts the wire and the contacting portion is formed of a metal with a resin coating.

9. The compact valve in accordance with claim 7, wherein surfaces of the first electrode and the second electrode are coated by resin.

10. A compact valve that opens and closes a fluid path with utilizing transformation of a shape memory alloy due to energization heating, characterized by that
the compact valve comprises:
a stationary structure of a cylindrical shape having a built-in orifice member that constitutes the fluid path;
a moving structure that contacts an inner periphery of the stationary structure and is freely movable to seal the orifice;
a wire formed of a shape memory alloy to move the moving structure;
a first electrode and a second electrode that is held by one or both of the stationary structure and the moving structure, hold the wire and energize the wire;
a first elastic member to apply a tensile stress to the wire as a bias;
a second elastic member to reduce a stress that the wire receives in energizing heating to the wire, and wherein
the moving structure is configured movable to seal the orifice by varying a length of the wire due to energization heating to the wire;
the orifice member is movably provided in the stationary structure independently from the stationary structure;
the first elastic member is provided between the orifice member and the moving structure in the stationary structure; and
the second elastic member is provided between the orifice member and an end portion of the stationary structure opposite to a side for sealing the orifice.

11. A compact valve that opens and closes a fluid path with utilizing transformation of a shape memory alloy due to energization heating, characterized by that
the compact valve comprises:
a stationary structure of a cylindrical shape having a built-in orifice member that constitutes the fluid path;
a moving structure that contacts an inner periphery of the stationary structure and is freely movable to seal the orifice;
a wire formed of a shape memory alloy to move the moving structure;
a first electrode and a second electrode that is held by one or both of the stationary structure and the moving structure, hold the wire and energize the wire;
a first elastic member to apply a tensile stress to the wire as a bias;
a second elastic member to reduce a stress that the wire receives in energizing heating to the wire, and wherein
the moving structure is configured movable to seal the orifice by varying a length of the wire due to energization heating to the wire;
the first electrode has a plate spring structure serving as a function of the second elastic member; and
the second electrode has a plate spring structure serving as a function of the first elastic member.

* * * * *